US012631866B2

(12) United States Patent
Wang et al.

(10) Patent No.: US 12,631,866 B2
(45) Date of Patent: May 19, 2026

(54) IMAGING MODULE BEARING DEVICE AND BASE, MICROSCOPIC IMAGE ACQUISITION DEVICE AND ADJUSTING METHOD

(71) Applicant: Shenzhen Anlv Medical Technology Co., Ltd, Shenzhen (CN)

(72) Inventors: Chunshu Wang, Shenzhen (CN); Zhiping Wang, Shenzhen (CN); Yahui Liu, Shenzhen (CN); Li Huang, Shenzhen (CN); Liming He, Shenzhen (CN)

(73) Assignee: Shenzhen Anlv Medical Technology Co., Ltd, Shenzhen (CN)

( * ) Notice: Subject to any disclaimer, the term of this patent is extended or adjusted under 35 U.S.C. 154(b) by 283 days.

(21) Appl. No.: 18/499,755

(22) Filed: Nov. 1, 2023

(65) Prior Publication Data

US 2024/0142759 A1 May 2, 2024

(30) Foreign Application Priority Data

Nov. 1, 2022 (CN) .......................... 202211355596.8

(51) Int. Cl.
*G02B 21/26* (2006.01)
*G02B 21/34* (2006.01)
*G02B 21/36* (2006.01)

(52) U.S. Cl.
CPC ............. *G02B 21/26* (2013.01); *G02B 21/34* (2013.01); *G02B 21/361* (2013.01)

(58) Field of Classification Search
CPC ...... G02B 21/26; G02B 21/34; G02B 21/361; G02B 21/24; G02B 21/241; G02B 7/023; G02B 7/04
See application file for complete search history.

(56) References Cited

U.S. PATENT DOCUMENTS

| | | | |
|---|---|---|---|
| 5,784,162 A | 7/1998 | Cabib et al. | |
| 9,891,407 B2 * | 2/2018 | Baek ......................... | G02B 7/10 |
| 2005/0174657 A1 * | 8/2005 | Honsho .................... | G02B 7/08 |
| | | | 359/819 |
| 2011/0304764 A1 * | 12/2011 | Shigemitsu ........ | G02B 13/0035 |
| | | | 348/E5.045 |
| 2012/0262704 A1 | 10/2012 | Zahniser | |
| 2020/0319152 A1 | 10/2020 | Ibsen et al. | |

* cited by examiner

*Primary Examiner* — Mustak Choudhury

(57) ABSTRACT

Disclosed herein are an imaging module bearing device and base, a microscopic image acquisition device and an adjusting method. The imaging module bearing device includes an imaging lens support, an imaging lens clamping base and an adjustment guide base; an imaging lens clamping base bottom portion is movably clamped between the imaging lens support and the adjustment guide base; and the levelness of an upper surface of the imaging lens clamping base bottom portion relative to an imaging lens support bottom portion can be adjusted until a microscopic imaging module fixed to the imaging lens clamping base is orthogonal to the upper surface of the imaging lens clamping base bottom portion, and the microscopic imaging module is fixed to the imaging lens clamping base.

18 Claims, 21 Drawing Sheets

280

220

660

210

260

270

230

A                                                    A

310

IMAGING MODULE BEARING DEVICE AND BASE, MICROSCOPIC IMAGE ACQUISITION DEVICE AND ADJUSTING METHOD

TECHNICAL FIELD

The present application belongs to the technical field of microscopic image acquisition, and particularly relates to an imaging module bearing device and base for bearing a microscopic image acquisition device, and the microscopic image acquisition device arranged on the imaging module bearing base.

BACKGROUND

In the prior art, manual microscope focal length adjustment is usually required during microscope imaging so as to acquire a clear target image. In the process of microscopic imaging with improved automatic focusing by means of an electric control system, due to the different magnification times of a microscope, the focal length adjustment process is a very delicate adjustment and control process, which has a high requirement for the precision of a power component, and also has a high requirement for the precision of a mechanical bearing mechanism for bearing the power component and a key imaging module.

When the magnification times are 40 times, the distance deviation between the focus of an objective lens and a target, that is, the allowable deviation of the focal depth, is approximately +/−0.25 um, and then the resolution for distance adjustment and movement between the objective lens and an imaging target needs to be in the same quantity level of the imaging focusing depth of field, thereby ensuring the adjustment reliability during an electronically controlled microscopic imaging focusing process. That is, if the range of the imaging depth of field of the microscope is 2 um-3 um, the movement precision of an electronically controlled mechanical platform for bearing the microscope to move should also be 2 um-3 um, and thus a microscope imaging device can stably acquire clear microscope method images during the movement process.

The plane precision should be 2 um-3 um during the movement process of the electronically controlled mechanical platform for bearing the microscope to move, on one hand, there is a requirement for the driving control precision of an electric motor, and there is a higher requirement for a base for bearing the microscope. With regard to the microscope, in order to have the appropriate magnification times, a lens combination is usually provided behind the objective lens to adjust light rays and is usually in a long cylindrical shape, and the central optical axis of the lens combination needs to be highly precisely orthogonal to the imaging target; and if an included angle between the central optical axis and a plane where the imaging target is located deviates, the tiny included angle between the central optical axis and the plane where the imaging target is located will also result in the great offset of the distance between the imaging target and the focus, the greater the optical axis length of the lens combination is, the greater the non-orthogonal influence of the central optical axis and the plane where the imaging target is located is, and unclear images and double images will appear in the microscopic images.

However, in the prior art, the machining precision requirements of mechanical components are in the exponential growth relationship with the machining cost, that is, the machining cost of a high-precision mechanical plane is much higher than that of a general-precision mechanical plane. One of the key technical problems to be solved by the present application is how to achieve the high-precision application requirements by the general-precision mechanical plane.

Even for the high-precision components, there are inevitably some machining size errors, and how to ensure that the central optical axis is orthogonal, as much as possible, to the plane where the imaging target is located during microscopic imaging under the condition of part size errors is also one of the key technical problems to be solved by the present application.

SUMMARY

The present application aims to solve the technical problem of possible non-orthogonal conditions of a central optical axis and a plane where an imaging target is located in the prior art, and provides an imaging module bearing device and base, a microscopic image acquisition device arranged on the imaging module bearing base, and a method.

The technical solution in the present application for solving the above-mentioned problem is as follows: the imaging module bearing device is configured to bear an imaging module in the microscopic image acquisition device and comprises an imaging lens support, an imaging lens clamping base and an adjustment guide base, where the adjustment guide base is fixedly connected to the imaging lens support; the imaging lens clamping base comprises an imaging lens clamping base bottom portion and a lens clamping portion; an imaging lens clamping base lens through hole passes through the imaging lens clamping base bottom portion and the lens clamping portion; the imaging lens support is provided with a support lens through hole; the adjustment guide base is provided with a guide base through hole; the lens clamping portion passes through the guide base through hole in the adjustment guide base such that the imaging lens clamping base bottom portion is movably clamped between the imaging lens support and the adjustment guide base; and when the imaging lens clamping base bottom portion is clamped between the imaging lens support and the adjustment guide base, the position of the support lens through hole corresponds to the position of the imaging lens clamping base lens through hole.

The technical solution in the present application for solving the above-mentioned problem can also be as follows: the microscopic image acquisition device comprises the imaging module bearing device or the imaging module bearing base, and further comprises a microscopic imaging module, where the microscopic imaging module is fixed to the imaging lens clamping base.

The technical solution in the present application for solving the above-mentioned problem can also be as follows: the adjusting method for the microscopic image acquisition device is based on the imaging module bearing device and a microscopic imaging module fixed to an imaging lens clamping base, where the microscopic imaging module comprises an objective lens; the objective lens passes through the imaging lens clamping base, the objective lens is clamped and fixed by the imaging lens clamping base, and one end of the objective lens is located below a plane where an imaging lens clamping base bottom portion is located; a target imaging optical axis passes through the objective lens; and the adjusting method comprises the following steps: Step A: acquiring a deviation direction of an imaging lens clamping base lens through hole from the target imaging optical axis, and if a deviation included angle between a plane where the imaging lens clamping base lens through hole is located and the target imaging optical axis is greater than a set target value, proceeding to Step B; Step B: selecting a limiting distance adjustment fastening member in a limiting position adjustment hole closest to an end portion of the objective lens, adjusting a downward passing depth of the limiting distance adjustment fastening member, and adjusting the force of the imaging lens clamping base bottom portion pressing a corresponding first elastic supporting member at the point; and Step C: checking the deviation included angle between the plane where the imaging lens clamping base lens through hole is located and the target imaging optical axis again, and if the deviation included angle is greater than the set target value, returning to Step B; and operating until the deviation included angle between the plane where the imaging lens clamping base lens through hole is located and the target imaging optical axis is less than or equal to the set target value.

Compared with the prior art, the present application has the first beneficial effect as follows: the imaging lens clamping base bottom portion is movably clamped between the imaging lens support and the adjustment guide base, such that there is an adjustable space between the imaging lens clamping base bottom portion and the imaging lens support, and there is an opportunity to adjust the perpendicularity of an optical axis of an imaging module, particularly a lens module, clamped on the imaging lens clamping base.

Compared with the prior art, the present application has the second beneficial effect as follows: the three first elastic supporting members are uniformly distributed with the support lens through hole serving as the center, elastic supporting surfaces or elastic supporting points of the first elastic supporting members face upwards and support the imaging lens clamping base bottom portion, a supporting surface supported by the three points is movable and adjustable, and pressing forces of the three points can be adjusted to adjust the levelness of the supporting surface, so as to offset the deviation of the levelness of the supporting surface caused by machining errors of related mechanical components.

Compared with the prior art, the present application has the third beneficial technical effect as follows: the pressing force of the single point can be directly adjusted by means of the limiting distance adjustment fastening member, thus a finer adjustment means is provided for adjustment of the deviation of the levelness of the supporting surface, and the fastening member can be a high-precision limiting distance adjustment fastening member.

Compared with the prior art, the present application has the fourth beneficial technical effect as follows: the limiting distance adjustment fastening members pass through limiting position adjustment through holes to be in direct contact with an upper surface of the imaging lens clamping base bottom portion, so as to adjust the pressure of the adjustment guide base pressing the corresponding first elastic supporting members, thereby adjusting downward movement distances of the first elastic supporting members pressed by the imaging lens clamping base bottom portion.

Compared with the prior art, the present application has the fifth beneficial technical effect as follows: position fixing fastening members sequentially pass through corresponding fixing through holes A1 and corresponding fixing through holes B1, so as to fix the relative positions of the adjustment guide base and the imaging lens clamping base bottom portion, that is, after the first elastic supporting members are adjusted in place, the relative positions of the adjustment guide base and the imaging lens clamping base bottom portion can be fixed.

Compared with the prior art, the present application has the sixth beneficial technical effect as follows: when the imaging lens clamping base bottom portion is pressed on the first elastic supporting members, the range of the downward movement distances of the first elastic supporting members is 0.3 mm-2 mm, and the distances are sufficient to offset the deviation of the levelness of the supporting surface caused by the machining errors of the related mechanical components.

Compared with the prior art, the present application has the seventh beneficial technical effect as follows: by means of at least three second elastic supporting members provided on the adjustment guide base, the centrality of the imaging lens clamping base is guaranteed, and the friction force between the adjustment guide base and the imaging lens clamping base is reduced.

Compared with the prior art, the present application has the eighth beneficial technical effect as follows: a movable plate is provided such that the imaging lens support acquires movement power by means of the movable plate. The movable plate can drive the imaging lens support to move longitudinally in the optical axis direction.

Compared with the prior art, the present application has the ninth beneficial technical effect as follows: by means of an imaging lens support vertical surface and two imaging lens support supporting half side vertical surfaces, an imaging lens support bottom portion more stably supports the imaging lens clamping base and the adjustment guide base.

Compared with the prior art, the present application has the tenth beneficial technical effect as follows: the center of a transverse supporting arm fixing through hole is fixed relative to the center of a second supporting through hole, which provides a basis for the subsequent coaxiality of corresponding optical components in a light source module, an imaging target clamping module and the imaging module bearing device.

Compared with the prior art, the present application has the eleventh beneficial technical effect as follows: a plurality of shock-proof damping support feet further enhance the mechanism stability and robustness of the imaging module bearing base, and reduces the influence caused by external shocks on the imaging module bearing base.

Compared with the prior art, the present application has the twelfth beneficial technical effect as follows: a bottom surface of a reagent card clamping base main body is parallel with a bottom surface of a reagent card clamping portion, such that a reagent card can be stably clamped by the reagent card clamping portion and can be orthogonal to the imaging optical axis.

Compared with the prior art, the present application has the thirteenth beneficial technical effect as follows: an XY-axis movement platform module can drive a reagent card clamping base module to perform horizontal two-dimensional movement, which improves the flexibility of a system and facilitates adjustment of an imaging target zone.

Compared with the prior art, the present application has the fourteenth beneficial technical effect as follows: third elastic supporting members can partially offset an assembly error between a bottom surface of the XY-axis movement platform module and a top surface of a second bearing support, and can adjust the levelness of the bottom surface of the XY-axis movement platform module. The levelness of the bottom surface of the XY-axis movement platform module is the levelness when it is orthogonal to the optical axis.

Compared with the prior art, the present application has the fifteenth beneficial technical effect as follows: fourth elastic supporting members can partially offset an assembly error between a top surface of the XY-axis movement platform module and a bottom surface of the reagent card clamping base module, and can adjust the levelness of the bottom surface of the reagent card clamping base module. The levelness of the bottom surface of the reagent card clamping base module is the levelness when it is orthogonal to the optical axis.

Compared with the prior art, the present application has the sixteenth beneficial technical effect as follows: by means of the structural design of the imaging module bearing device, and in combination with screw type fastening members, the distance adjustment precision can be improved by the limiting distance adjustment fastening members, so that the included angle α between the imaging module and an ideal optical axis can be adjusted more fine, and the movement distance, namely, the distance L2, in the optical axis direction can be adjusted more fine. In the balance of the component machining precision and the cost, high-precision size adjustment can be achieved by means of the relatively low machining precision, which is an efficient and low-cost solution. High-precision position adjustment can be achieved by means of the low-precision component machining sizes, and the distance adjustment in mm between the imaging lens clamping base bottom portion and the adjustment guide base can be converted into the distance adjustment in finer size of the objective lens in the optical axis direction. That is, the distance adjustment in mm between the imaging lens clamping base bottom portion and the adjustment guide base can be converted into the finer distance adjustment of the objective lens in the optical axis direction; and a lens of the imaging module bearing device and the imaging optical axis where the lens is located can be conveniently adjusted to the position orthogonal to the plane where the imaging lens clamping base lens through hole is located, thereby ensuring that during imaging in the target zone, the imaging optical axis can be orthogonal to the reagent card clamped on the reagent card clamping base module, and ensuring the high quality of a microscopic image.

DETAILED DESCRIPTION OF THE EMBODIMENTS

Figure 1:
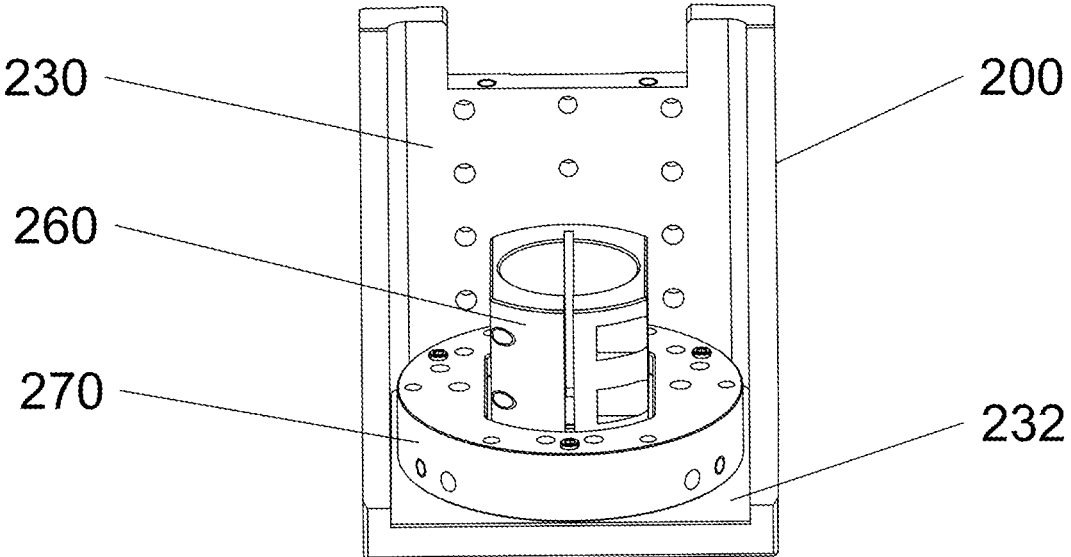
FIG. 1 is a schematic diagram of the first embodiment of an imaging module bearing device 200 in an assembled state.

The present application is described in detail below with reference to the accompanying drawings and in conjunction with embodiments. Each example is provided to explain the present application instead of limiting the present application. In fact, those skilled in the art will know that modifications and variations may be made in the present application without departing from the scope or spirit of the present application. For example, features shown or described as part of one embodiment may be used in another embodiment to produce yet another embodiment. Therefore, it is expected that the present application includes such modifications and variations that fall within the scope of the appended claims and equivalents thereof.

In the descriptions of the present application, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present application, and do not indicate that the present application must be constructed and operated in the specific orientations. Therefore, they cannot be understood as limitations on the present application. The terms "connection", "connecting" and "arrangement" used in the present application should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present application. Numeral and letter marks are used in the detailed descriptions to refer to the features in the accompanying drawings. Similar or like marks in the accompanying drawings and the descriptions have been used to refer to similar or like parts of the present application. As used herein, the terms "first", "second", "third" and the like are used interchangeably so as to distinguish one component from another, and are not intended to indicate the positions or the importance of the individual components.

The implementation of the present application is further described in detail below in conjunction with the accompanying drawings.

It should be noted that the below are descriptions of preferred embodiments of the present application, and are not intended to limit the present application. The descriptions of the preferred embodiments of the present application are merely descriptions of general principles of the present application. The embodiments described in the present application are merely part of embodiments of the present application, not all of them. On the basis of the embodiments of the present application, all other embodiments obtained by those of ordinary skill in the art without involving any inventive effort should fall within the scope of protection of the present application.

In the description of the present application, it should be understood that orientation or position relationships indicated by terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise" and the like are orientation or position relationships based on the accompanying drawings, are only for the purposes of facilitating the description of the present application and simplifying the description, and do not indicate or imply that a device or an element referred to must have the specific orientation or be constructed and operated in the specific orientation. Therefore, they cannot be understood as limitations on the present application. Besides, terms "first" and "second", the technical features numbered with Arabic numerals 1, 2, 3 and the like, and numbers such as "A" and "B" are only for the purpose of describing, are only for the purpose of facilitating describing, cannot represent the temporal or spatial sequence relationships, and cannot be understood as indicating or implying the relative importance or implicitly indicating the number of the technical features indicated. Thus, the features defined as "first" and "second" and numbered with Arabic numerals 1, 2, 3 and the like can explicitly or implicitly include one or more such features. In the descriptions of the present application, unless otherwise specified, "a plurality of" means two or more.

Figure 2:
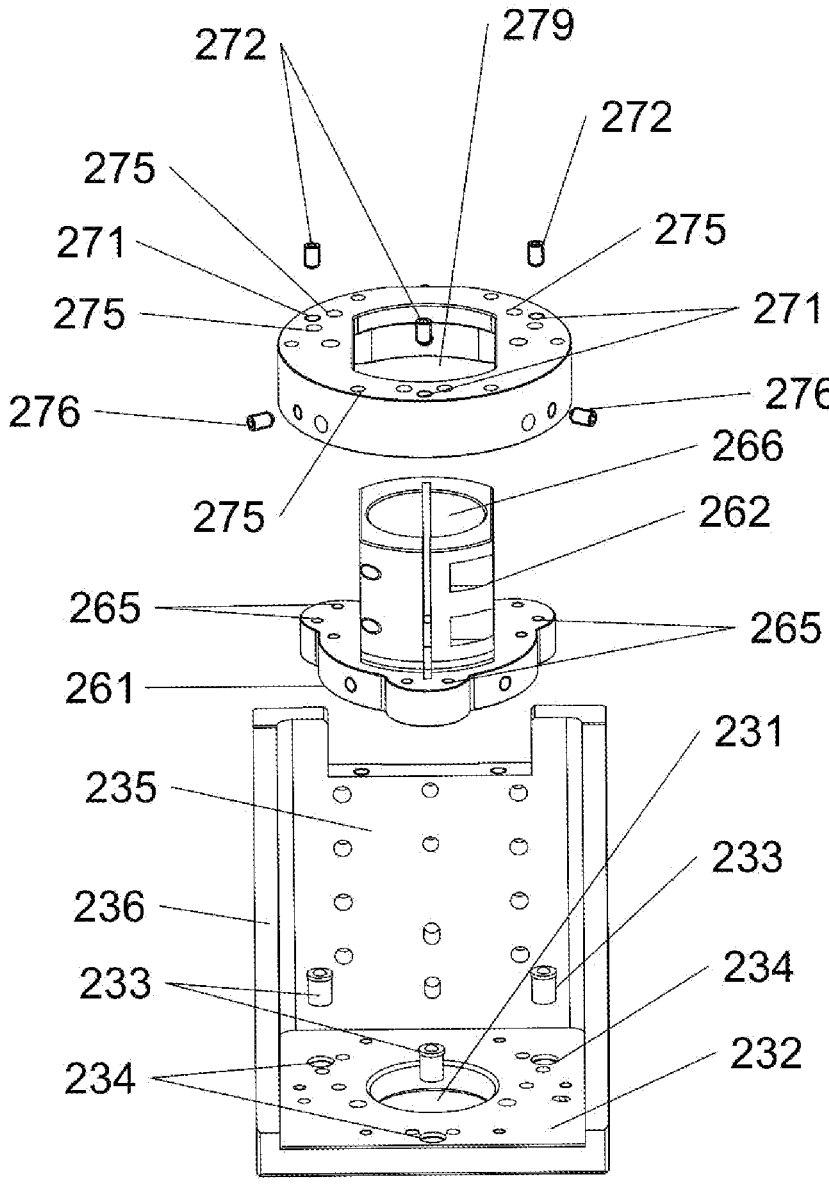
FIG. 2 is a schematic diagram of the first embodiment of the imaging module bearing device 200 in a disassembled state.

As shown in FIGS. 1-2, an embodiment of an imaging module bearing device 200 includes an imaging lens support 230, an imaging lens clamping base 260 and an adjustment guide base 270, where the adjustment guide base 270 is fixedly connected to the imaging lens support 230; the imaging lens clamping base 260 includes an imaging lens clamping base bottom portion 261 and a lens clamping portion 262; an imaging lens clamping base lens through hole 266 passes through the imaging lens clamping base bottom portion 261 and the lens clamping portion 262; the imaging lens support 230 is provided with a support lens through hole 231; the adjustment guide base 270 is provided with a guide base through hole 279; the lens clamping portion 262 passes through the guide base through hole 279 in the adjustment guide base 270 such that the imaging lens clamping base bottom portion 261 is movably clamped between the imaging lens support 230 and the adjustment guide base 270; and when the imaging lens clamping base bottom portion 261 is clamped between the imaging lens support and the adjustment guide base, the position of the support lens through hole 231 corresponds to the position of the imaging lens clamping base lens through hole 266.

Figure 3:
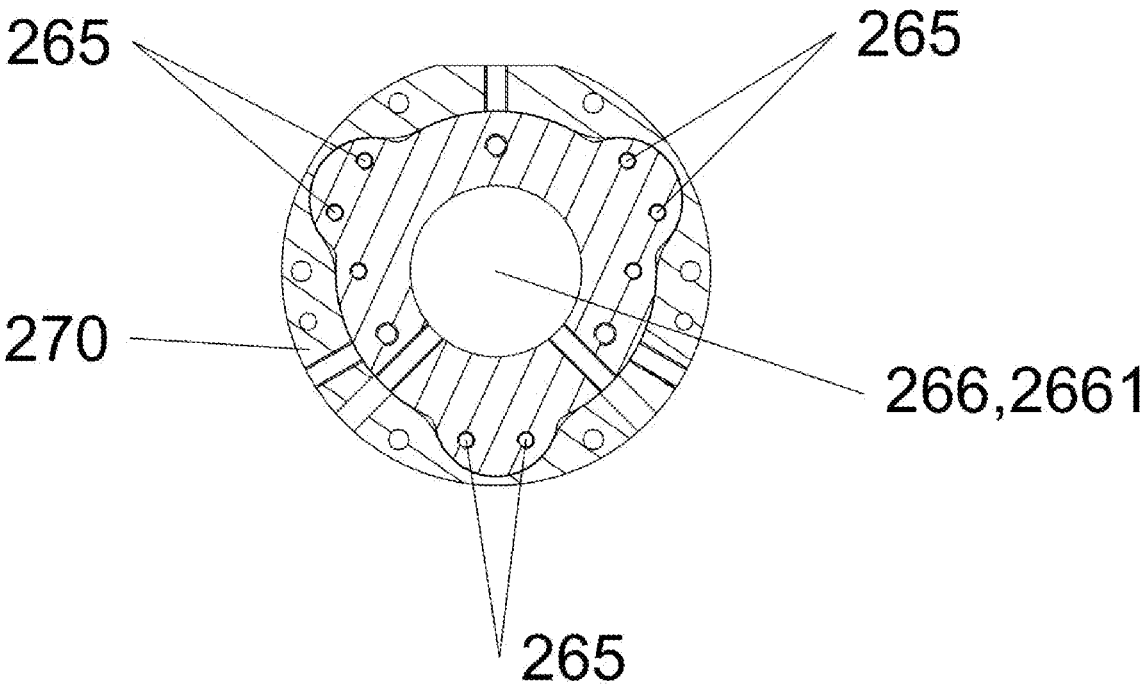
FIG. 3 is bottom view of an imaging lens clamping base 260 and an adjustment guide base 270 in an assembled state.
Figure 4:
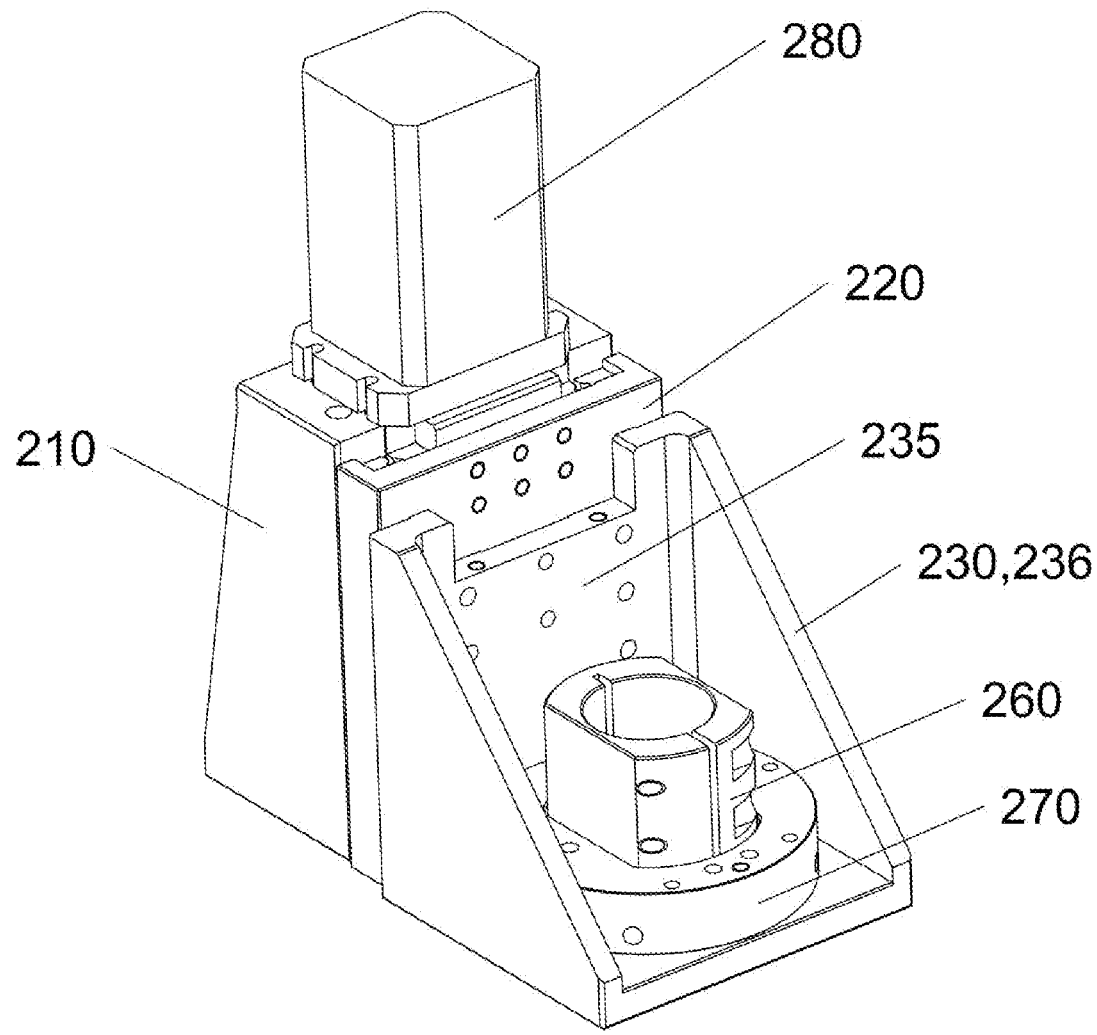
FIG. 4 is a schematic diagram of the second embodiment of the imaging module bearing device 200 in an assembled state.
Figure 5:
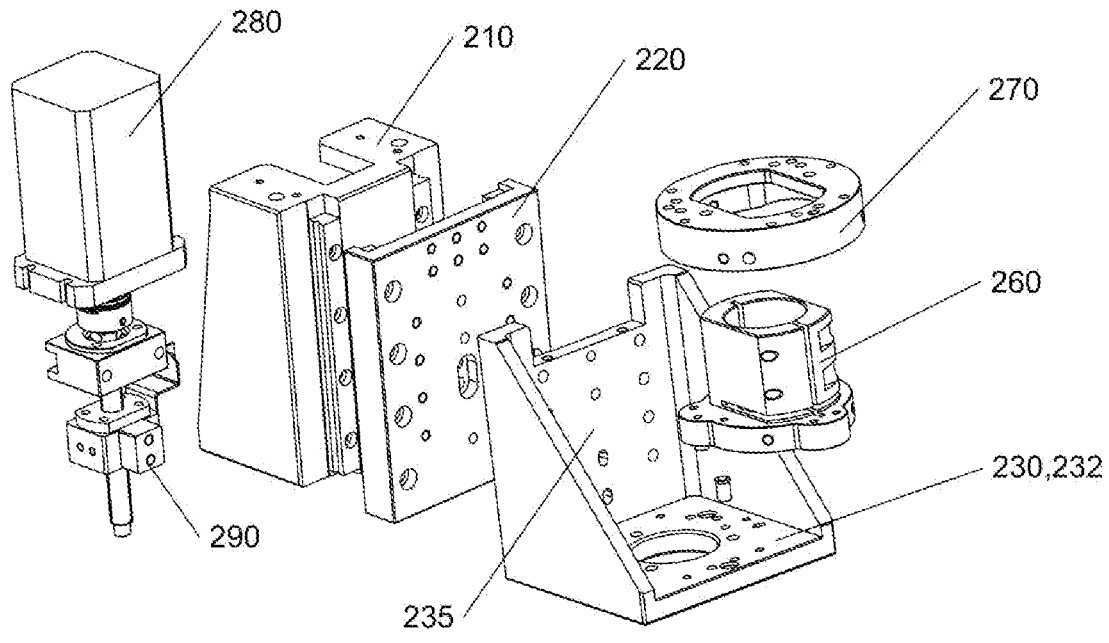
FIG. 5 is the first schematic diagram of the second embodiment of the imaging module bearing device 200 in a disassembled state.
Figure 6:
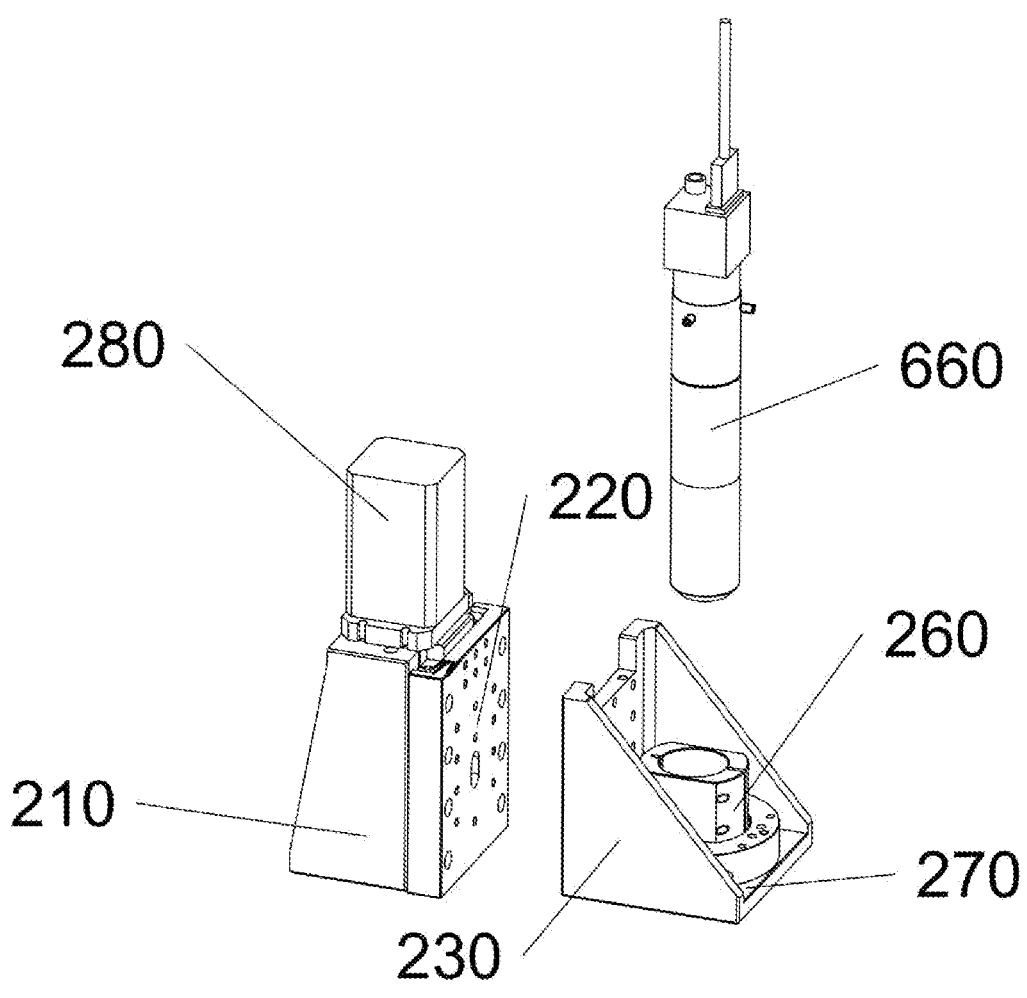
FIG. 6 is the second schematic diagram of the second embodiment of the imaging module bearing device 200 in the disassembled state.
Figure 7:
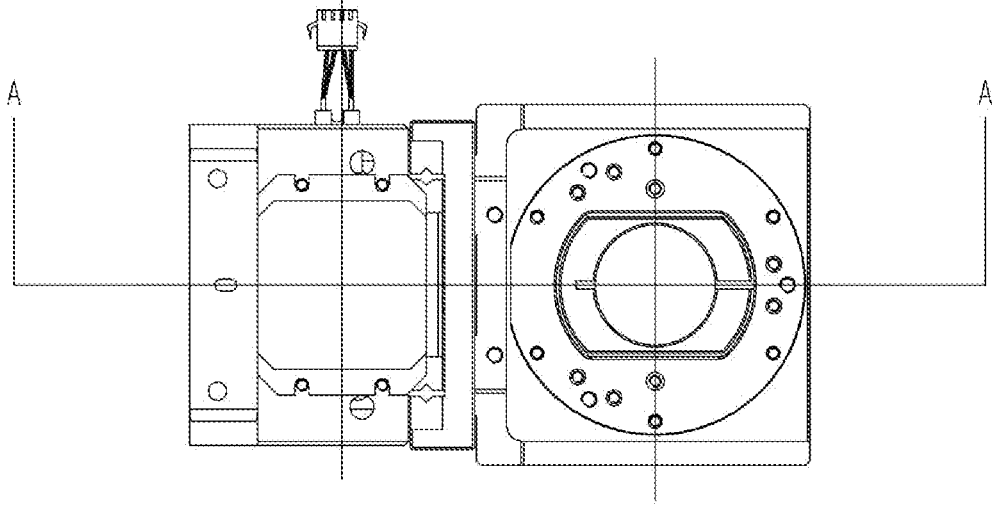
FIG. 7 is a top orthographic projection view of the second embodiment of the imaging module bearing device 200.
Figure 8:
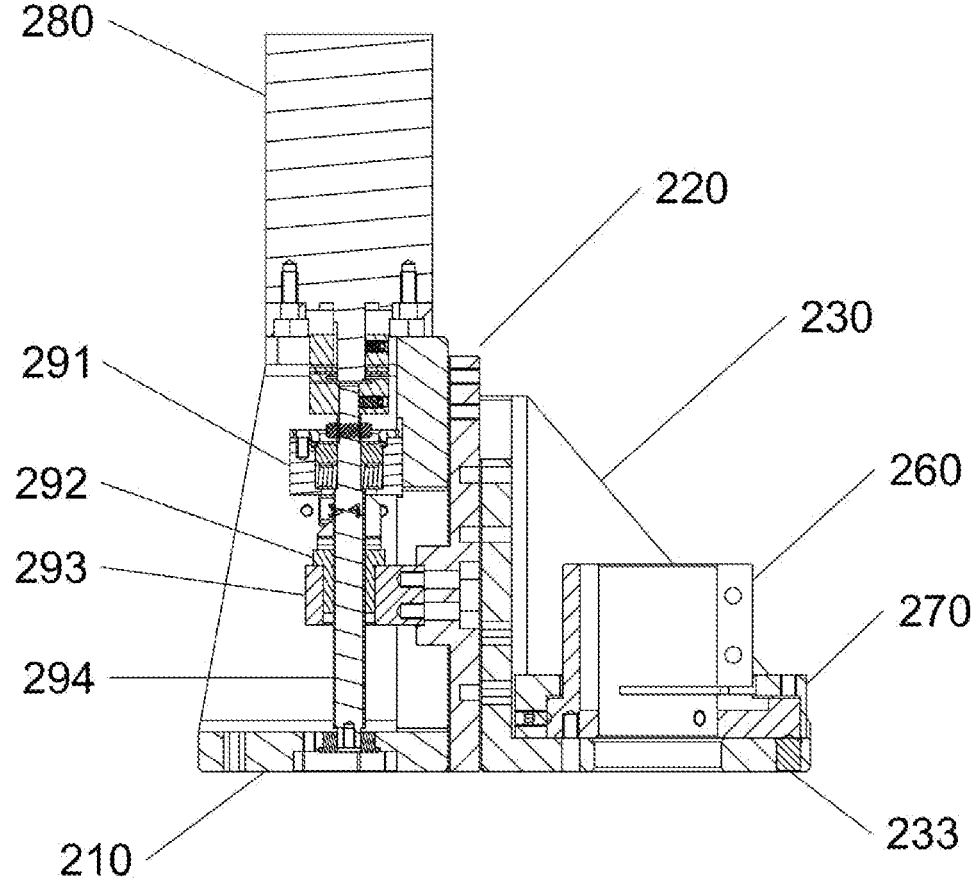
FIG. 8 is an AA sectional view of FIG. 7.

In the embodiment of the imaging module bearing device 200 as shown in FIGS. 1-3, the imaging lens support 230 includes an imaging lens support bottom portion 232; the support lens through hole 231 is formed in the imaging lens support bottom portion 232; the imaging lens support bottom portion 232 is provided with at least three first elastic supporting members 233, and the plurality of first elastic supporting members 233 are uniformly distributed with the support lens through hole 231 serving as the center; and elastic supporting surfaces or elastic supporting points of the first elastic supporting members 233 face upwards and are configured to support the imaging lens clamping base bottom portion 261. The imaging lens support bottom portion 232 is provided with first elastic supporting member counterbores 234, the first elastic supporting member counterbores 234 are configured to accommodate the first elastic supporting members 233, and bottom ends of the first elastic supporting members 233 fall into the first elastic supporting member counterbores 234 for supporting. The first elastic supporting member counterbores 234 are in one-to-one correspondence with the first elastic supporting members 233 in number and position; and the first elastic supporting member counterbores 234 are not through holes.

In the embodiment of the imaging module bearing device 200 as shown in FIGS. 1-3, the adjustment guide base 270 is provided with at least three limiting position adjustment holes 271, and the limiting position adjustment holes 271 are internally provided with limiting distance adjustment fastening members 272; and the position of each of the limiting position adjustment holes 271 corresponds to the position of the respective first elastic supporting member 233. The distance in which each limiting distance adjustment fastening member 272 penetrates into the respective limiting position adjustment hole 271 is adjusted to adjust the pressure of the adjustment guide base 270 pressing the corresponding first elastic supporting member 233 at that point.

In the embodiment of the imaging module bearing device 200 as shown in FIGS. 1-3, each of the limiting position adjustment holes 271 is a limiting position adjustment through hole; and each of the limiting distance adjustment fastening members 272 passes through the respective limiting position adjustment through hole to be in contact with the imaging lens clamping base bottom portion 261. The limiting distance adjustment fastening members 272 pass through the limiting position adjustment through holes 271 to be in direct contact with an upper surface of the imaging lens clamping base bottom portion 261, so as to adjust the pressure of the adjustment guide base 270 pressing the corresponding first elastic supporting members 233, thereby adjusting downward movement distances of the first elastic supporting members 233 pressed by the imaging lens clamping base bottom portion 261.

In the embodiment of the imaging module bearing device 200 as shown in FIGS. 1-2, two position fixing through holes A1 275 are symmetrically formed on two sides of each of the limiting position adjustment holes 271 in the adjustment guide base 270; correspondingly, two position fixing through holes B1 265 are also formed in the imaging lens clamping base bottom portion 261; and position fixing fastening members sequentially pass through the corresponding fixing through holes A1 275 and the corresponding fixing through holes B1 265, so as to fix the relative positions of the adjustment guide base 270 and the imaging lens clamping base bottom portion 261. The position fixing fastening members are not shown in the drawings. When the imaging lens clamping base bottom portion 261 is pressed on the first elastic supporting members 233, the range of the downward movement distances of the first elastic supporting members 233 is 0.3 mm-2 mm or 0.5 mm-1.2 mm.

In the embodiment of the imaging module bearing device 200 as shown in FIGS. 1-3, the adjustment guide base 270 is provided with at least three second elastic supporting members 276 which are configured to radially support the imaging lens clamping base bottom portion 261; the second elastic supporting members 276 are uniformly distributed with the geometric center of the adjustment guide base 270 serving as the center, and the second elastic supporting members 276 are radially arranged with the imaging lens clamping base lens through hole 266 serving as the center; and elastic supporting surfaces or elastic supporting points of the second elastic supporting members 276 face the radial center of the imaging lens clamping base lens through hole 266 and are configured to be in contact with a side wall of the imaging lens clamping base bottom portion 261. By means of the at least three second elastic supporting members 276 provided on the adjustment guide base 270, the centrality of the imaging lens clamping base 260 is guaranteed, and the friction force between the adjustment guide base 270 and the imaging lens clamping base 260 is reduced.

In the embodiment of the imaging module bearing device 200 as shown in FIGS. 1-4, the imaging lens support 230 further includes an imaging lens support vertical surface 235 and two imaging lens support supporting half side vertical surfaces 236; the imaging lens support 230 is fixedly connected to a movable plate 220 by means of the imaging lens support vertical surface 235 such that the imaging lens support 230 can move along with the movable plate 220; and the imaging lens support bottom portion 232 is fixedly connected to the imaging lens support vertical surface 235 by means of the two imaging lens support supporting half side vertical surfaces 236.

In the embodiment of the imaging module bearing device 200 as shown in FIGS. 4-8, an electric motor support 210, the movable plate 220, an electric motor main body 280 and a driving force output device 290 are further included; the electric motor support 210 is configured to fix the electric motor main body 280 for driving an imaging module to move; the electric motor main body 280 is fixed to the electric motor support 210; a rotating shaft of the electric motor main body 280 is connected to the driving force output device 290; and the driving force output device 290 is connected to the movable plate 220 to drive the movable plate 220 to move. The movable plate 220 is configured to be connected to the driving force output device 290 of the electric motor main body 280; and the imaging lens support 230 is fixedly connected to the movable plate 220, and the imaging lens support 230 acquires movement power by means of the movable plate 220.

In the embodiment of the imaging module bearing device 200 as shown in FIGS. 4-8, the driving force output device 290 includes a bearing block module 291, a ball screw nut 292, a ball screw nut fastening base 293 and a ball screw 294; the bearing block module 291 is sleeved on the rotating shaft of an electric motor, and the ball screw 294 is connected to the rotating shaft of the electric motor; the ball screw nut 292 is sleeved on the ball screw 294; and the ball screw nut fastening base 293 is connected to the ball screw nut 292, and the ball screw nut fastening base 293 is fixedly connected to the movable plate 220 to move along with the ball screw nut 292.

Figure 9:
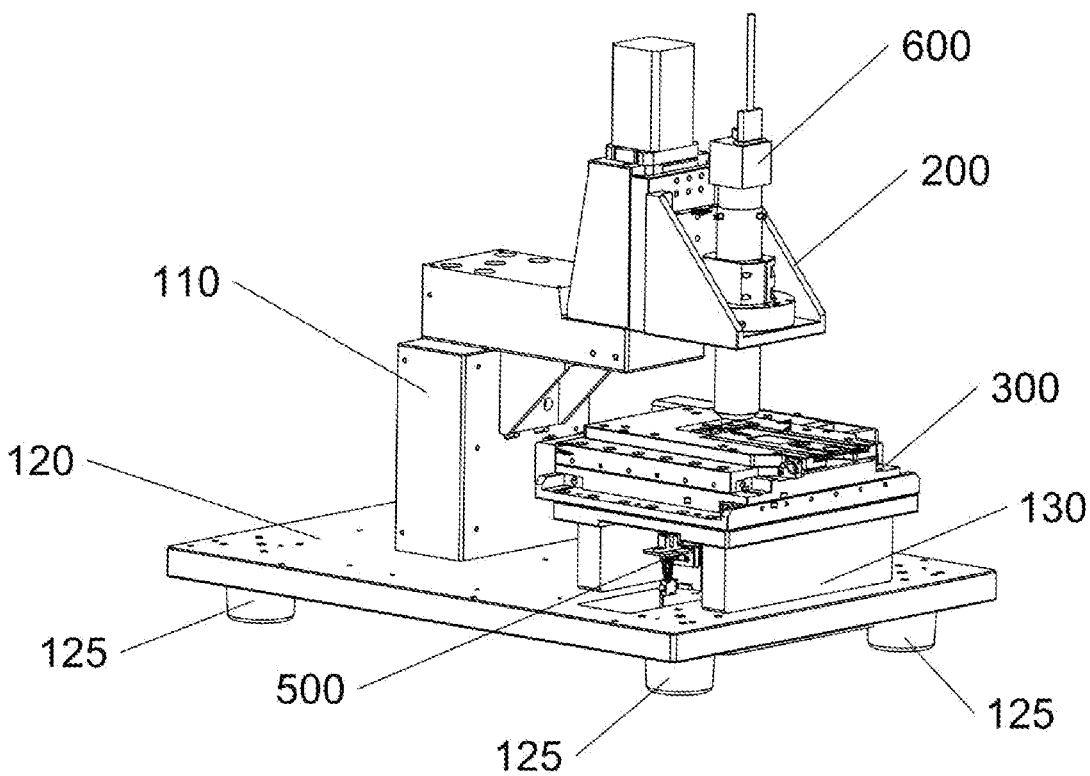
FIG. 9 is a schematic diagram of the first embodiment of a microscopic image acquisition device in an assembled state.
Figure 10:
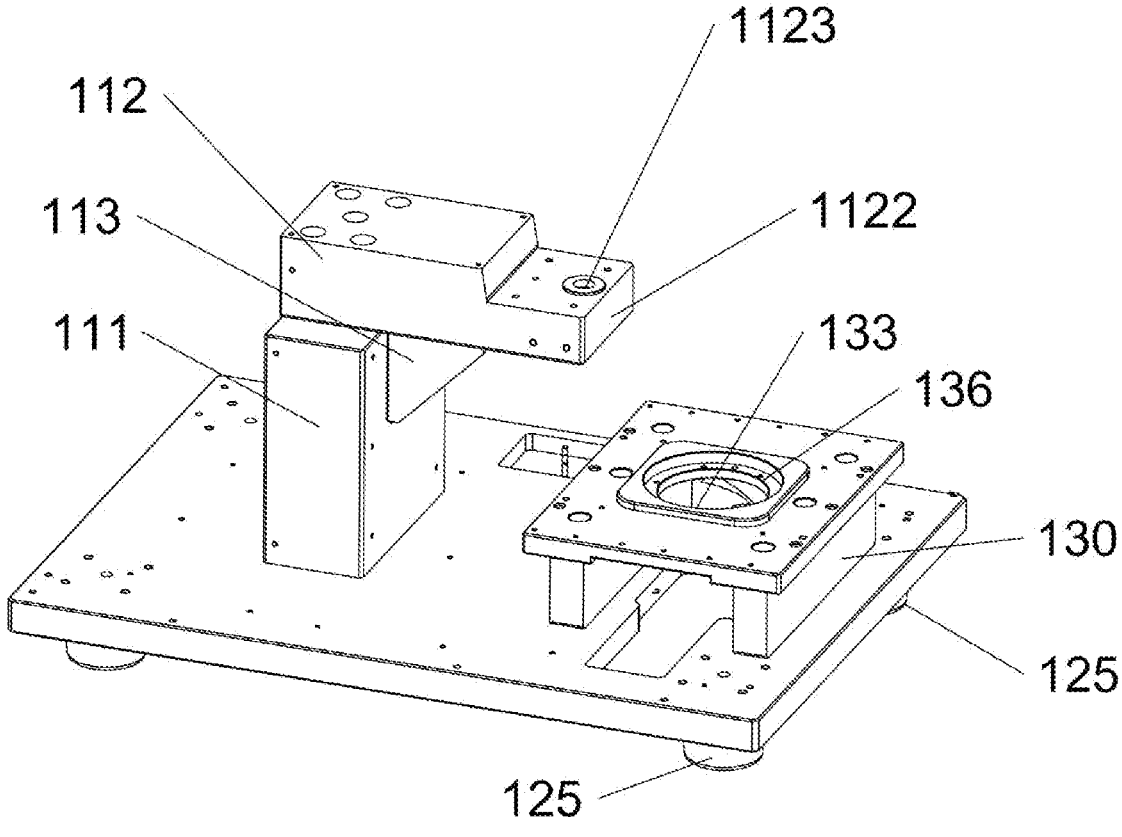
FIG. 10 is a schematic diagram of the first embodiment of an imaging module bearing base in an assembled state.
Figure 11:
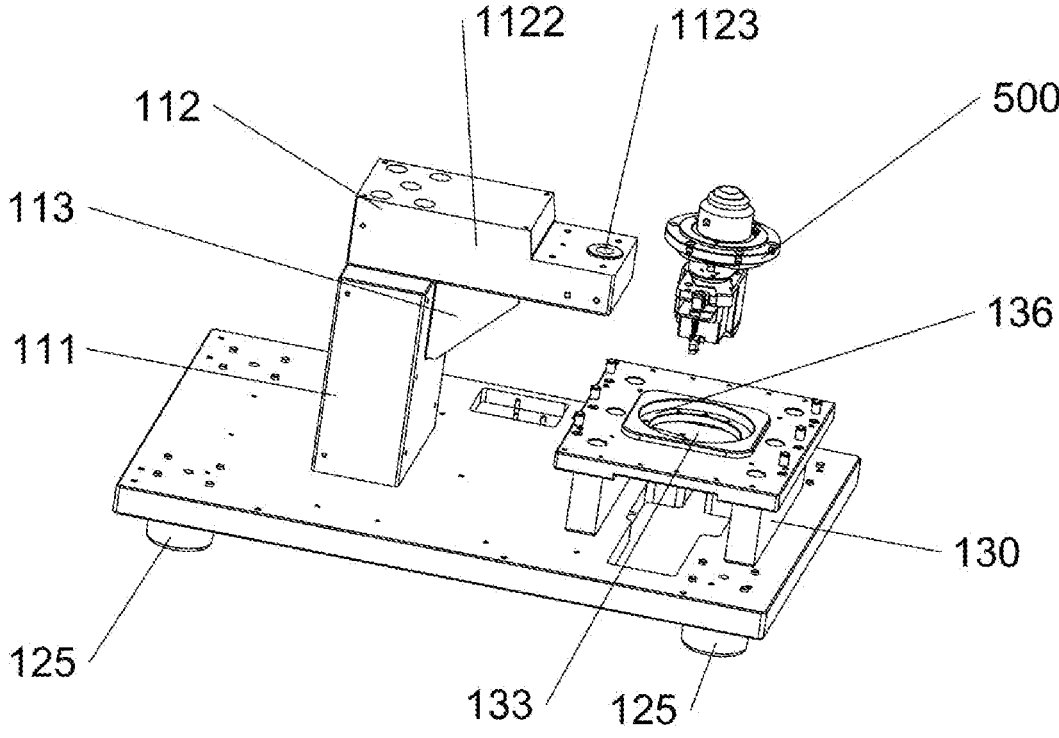
FIG. 11 is a schematic diagram of the imaging module bearing base and a light source module in a disassembled state.
Figure 12:
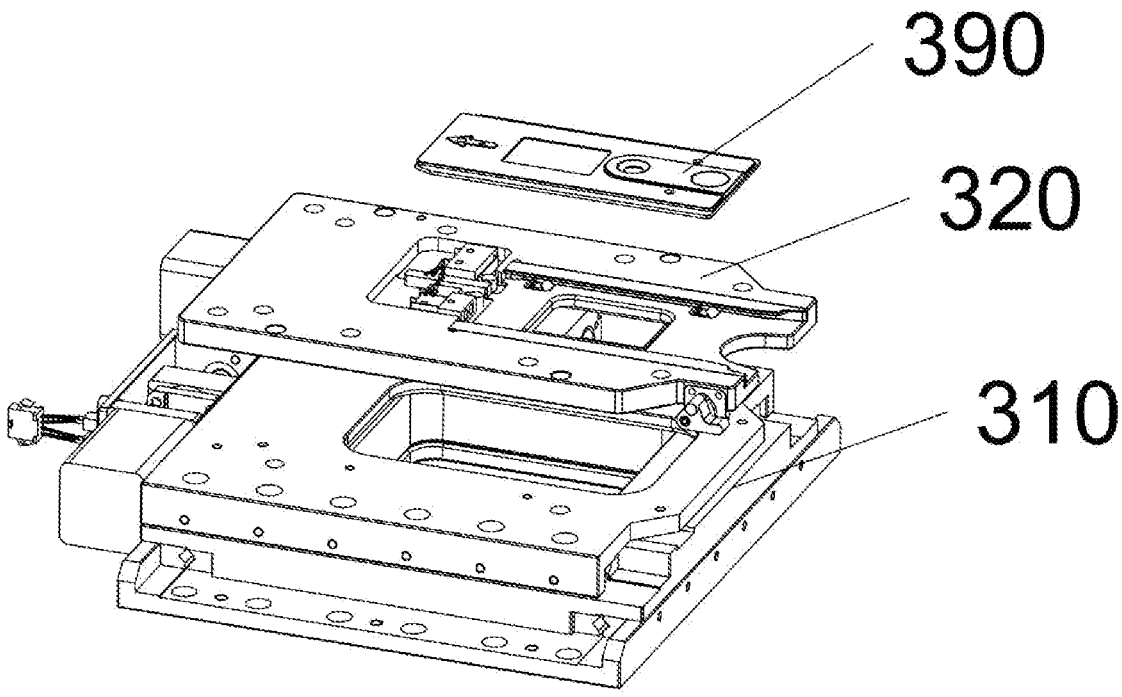
FIG. 12 is a schematic diagram of an imaging target clamping module 300 in a disassembled state.
Figure 13:
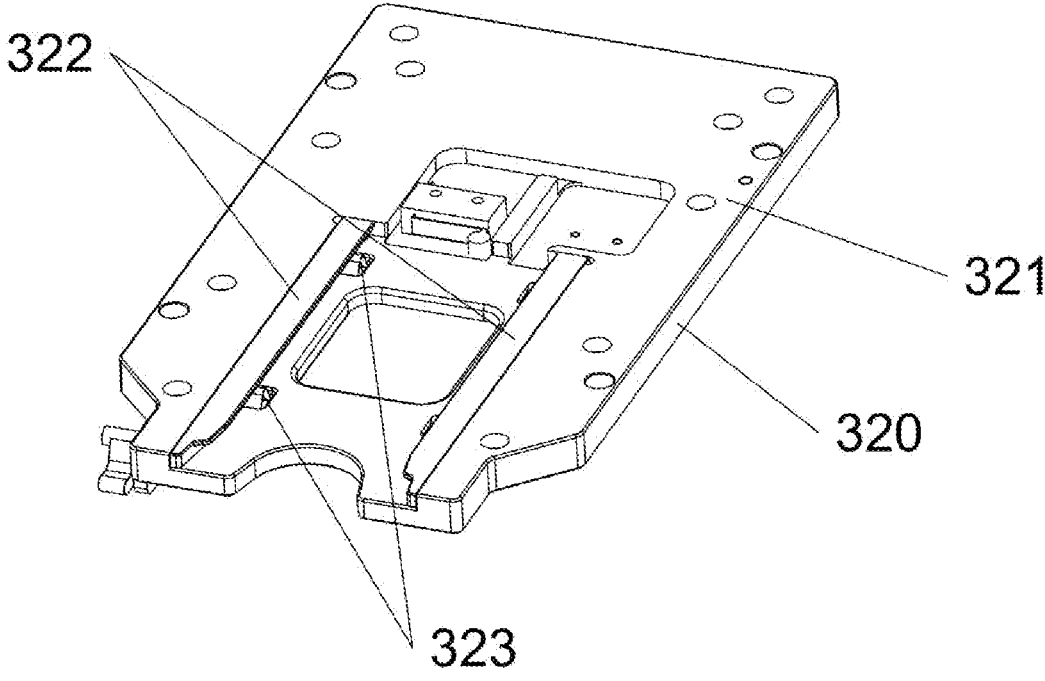
FIG. 13 is a schematic diagram of a reagent card clamping base module 320.
Figure 14:
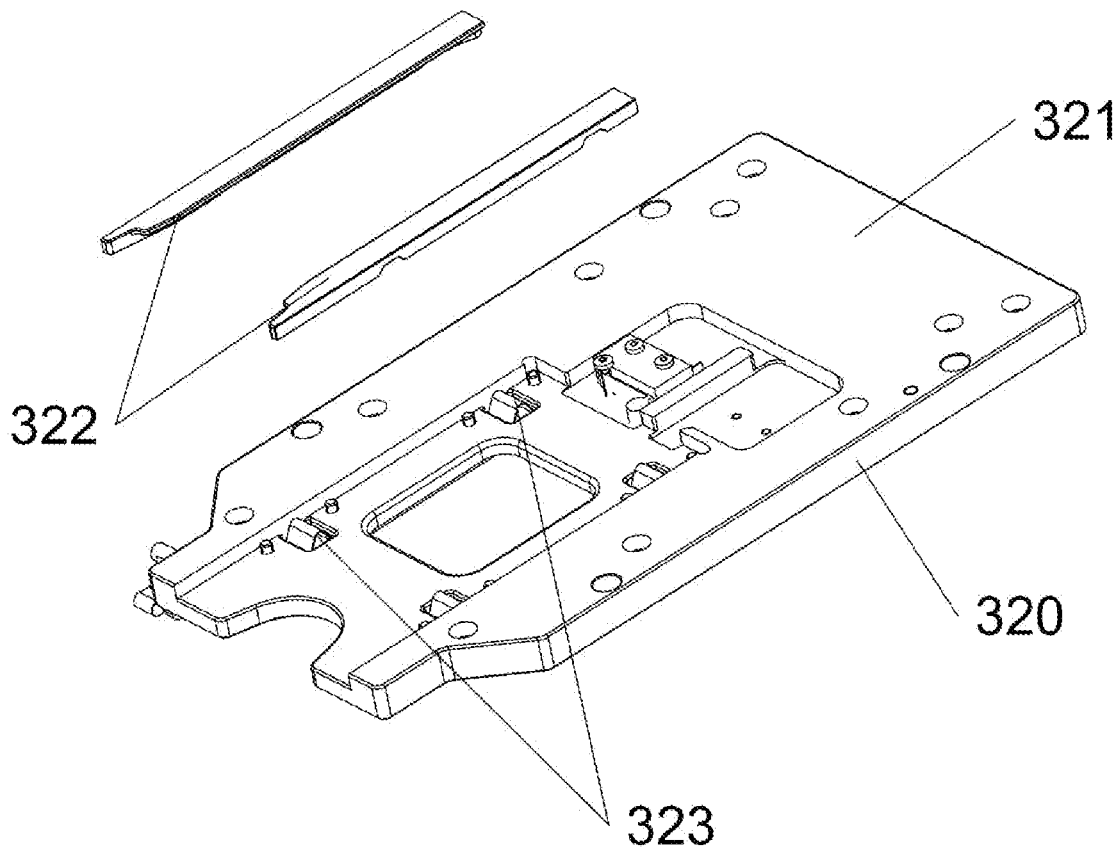
FIG. 14 is a schematic diagram of the reagent card clamping base module 320 in a disassembled state.
Figure 15:
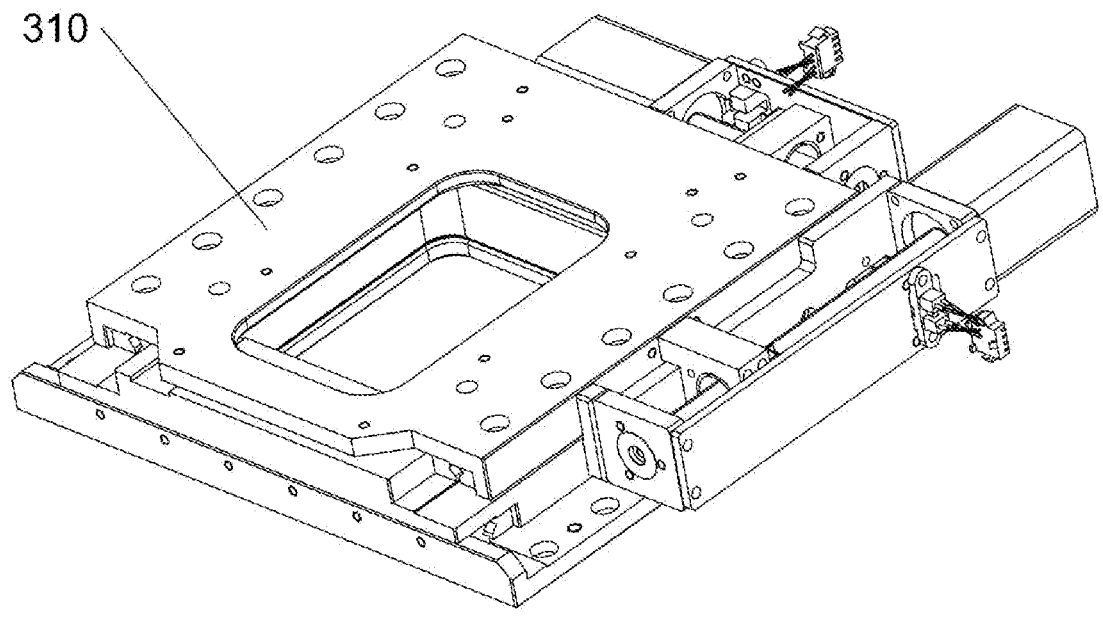
FIG. 15 is a schematic diagram of an XY-axis movement platform module 310.

As shown in FIGS. 9-11, an embodiment of an imaging module bearing base for bearing a microscopic image acquisition device includes the imaging module bearing device 200, a bearing base plate 120, a first bearing support 110, a second bearing support 130 and an imaging target clamping module 300, where the first bearing support 110 and the second bearing support 130 are arranged on the bearing base plate 120 respectively; the first bearing support 110 is configured to bear the imaging module bearing device 200; the second bearing support 130 is configured to bear the imaging target clamping module 300 such that the imaging target clamping module 300 is arranged below the imaging module bearing device 200; and the bottom of the bearing base plate 120 is provided with a plurality of shock-proof damping support feet 125.

As shown in FIGS. 9-11, in the embodiment of the imaging module bearing base for bearing the microscopic image acquisition device, the first bearing support 110 includes a longitudinal supporting column 111 and a transverse supporting arm 112, the longitudinal supporting column 111 is fixedly connected to one end of the transverse supporting arm 112, and the connection of a transverse supporting arm outward extension portion 1122 with the longitudinal supporting column 111 is enhanced by means of a reinforcing corner brace 113; the transverse supporting arm outward extension portion 1122 is provided with a transverse supporting arm fixing through hole 1123, and the imaging module bearing device 200 is fixed to the transverse supporting arm 112 by means of the transverse supporting arm fixing through hole 1123; and the second bearing support 130 is provided with a second supporting through hole 133, and the center of the transverse supporting arm fixing through hole 1123 is fixed relative to the center of the second supporting through hole 133. This is one of the measures to ensure the coaxiality of various optical components on the optical axis.

As shown in FIGS. 12-16, in the embodiment of the imaging module bearing base for bearing the microscopic image acquisition device, the imaging target clamping module 300 includes an XY-axis movement platform module 310 and a reagent card clamping base module 320; the reagent card clamping base module 320 is configured to clamp an external reagent card 390; the reagent card clamping base module 320 is fixed to the top of the XY-axis movement platform module 310; and the XY-axis movement platform module 310 is fixed to the top of the second bearing support 130. The reagent card clamping base module 320 includes a reagent card clamping base main body 321 and a reagent card clamping portion 322; the reagent card clamping portion 322 is configured to clamp the externally inserted reagent card 390; and a bottom surface of the reagent card clamping base main body 321 is parallel with a bottom surface of the reagent card clamping portion 322. The reagent card clamping base main body 321 and the reagent card clamping portion 322 can be integrally formed or combined, and can also be separate split components. The reagent card clamping base main body 321 is further provided with a plurality of elastic clamping components 323, the reagent card clamping portion 322 includes two reagent card clamping strips, and two elastic clamping components 323 are arranged below each reagent card clamping strip; and the external reagent card 390 is clamped between the reagent card clamping portion 322 and the elastic clamping components 323.

Figure 16:
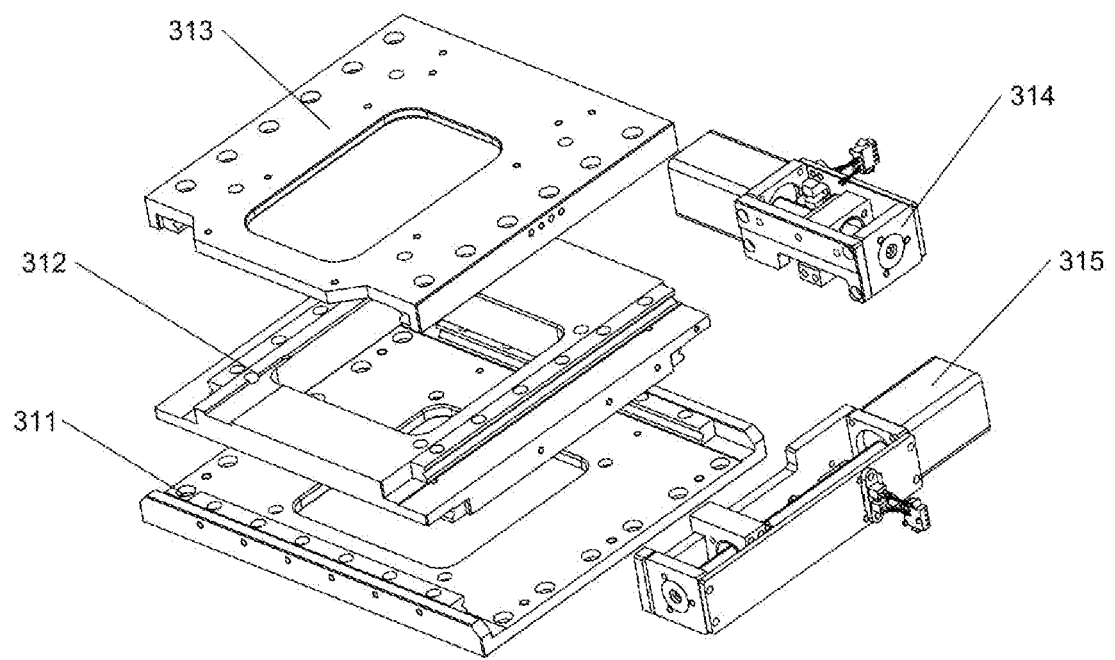
FIG. 16 is a schematic diagram of the XY-axis movement platform module 310 in a disassembled state.
Figure 17:
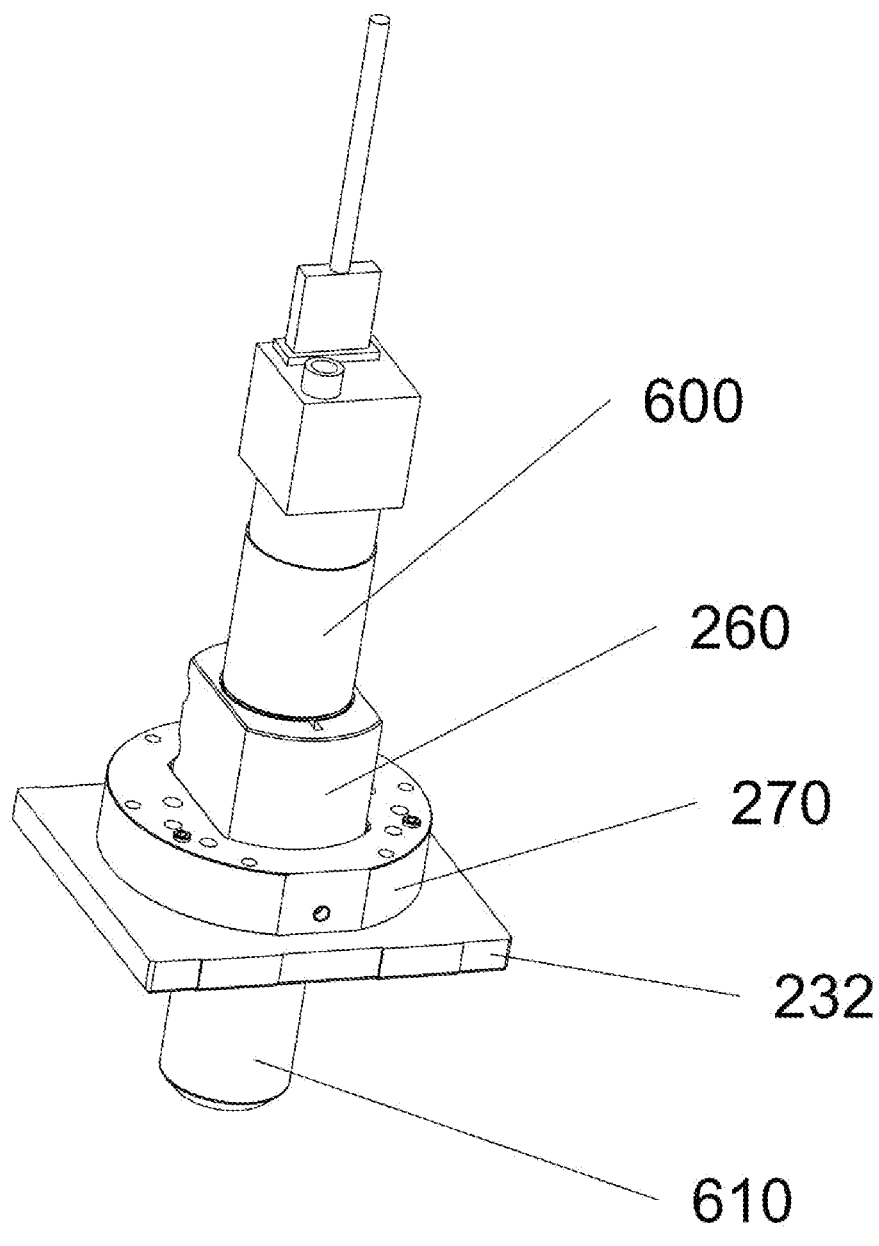
FIG. 17 is a schematic diagram of the imaging lens clamping base 260, the adjustment guide base 270 and an imaging lens support bottom portion 232 in an assembled state.
Figure 18:
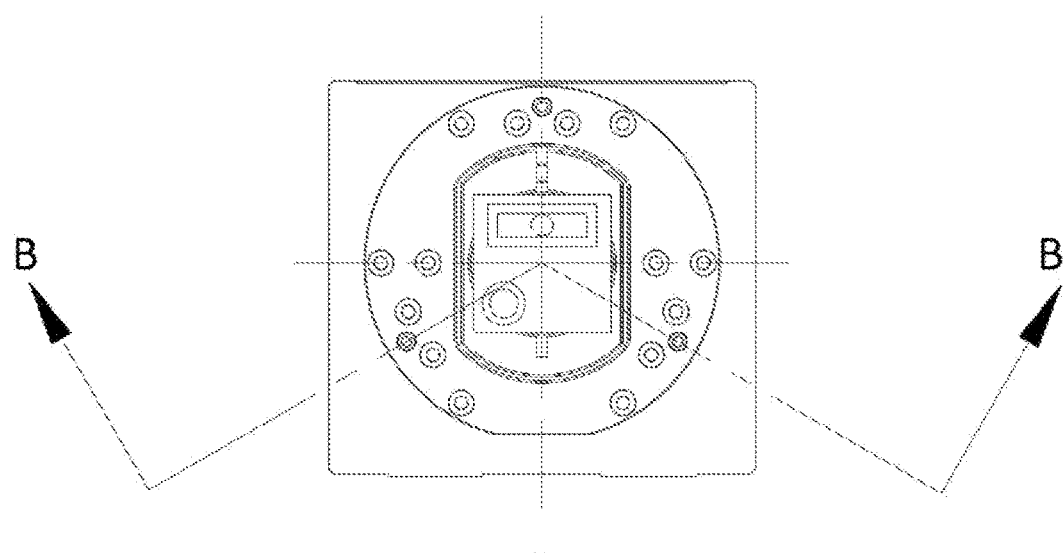
FIG. 18 is a top view of the imaging lens clamping base 260, the adjustment guide base 270 and the imaging lens support bottom portion 232 in the assembled state.

As shown in FIG. 16, in the embodiment of the imaging module bearing base for bearing the microscopic image acquisition device, the XY-axis movement platform module 310 includes a movement platform base 311, a first movement module 312, a second movement module 313, a first driving electric motor 315 and a second driving electric motor 314; the first driving electric motor 315 is connected to the first movement module 312 so as to drive the first movement module 312 to move in a horizontal direction; the second driving electric motor 314 is connected to the second movement module 313 so as to drive the second movement module 313 to move in the horizontal direction; and the movement direction of the first movement module 312 is orthogonal to the movement direction of the second movement module 313, so as to complete two-dimensional movement of the XY-axis movement platform module 310 on a horizontal plane.

The following is not shown in the drawings: in the embodiment of the imaging module bearing base for bearing the microscopic image acquisition device, the second bearing support 130 is provided with a plurality of third elastic supporting members which are configured to adjust the levelness of a bottom surface of the XY-axis movement platform module 310. A top surface of the XY-axis movement platform module 310 is provided with a plurality of fourth elastic supporting members which are configured to adjust the levelness of a bottom surface of the reagent card clamping base module 320.

As shown in FIGS. 9-11, in the embodiment of the imaging module bearing base for bearing the microscopic image acquisition device, a light source module 500 is further included; a light source fixing circular truncated cone 136 is arranged on the second bearing support 130 and takes the second supporting through hole 133 as the center; the light source module 500 is fixed to the light source fixing circular truncated cone 136; and a light source emitted light ray in the light source module 500 and an imaging lens in the imaging module bearing device 200 are located on the same imaging optical axis.

As shown in FIGS. 3 and 9-17, an embodiment of the microscopic image acquisition device includes the imaging module bearing device 200, the imaging module bearing base, and a microscopic imaging module 600, where the microscopic imaging module 600 is fixed to the imaging lens clamping base 260. The microscopic imaging module 600 is fixed to the imaging lens clamping base 260. The microscopic imaging module 600 includes an objective lens 610; the objective lens 610 passes through the imaging lens clamping base 260, the objective lens 610 is clamped and fixed by the imaging lens clamping base 260, and one end of the objective lens 610 is located below a plane where the imaging lens clamping base bottom portion 261 is located; the objective lens 610 is located on a target imaging optical axis; and a bottom surface of the imaging lens clamping base lens through hole 266 is an imaging lens clamping base bottom portion through hole 2661.

An embodiment of an adjusting method for the microscopic image acquisition device, which is not shown in the drawings, includes the following steps: Step A: acquiring a deviation direction of the imaging lens clamping base bottom portion through hole 2661 from the target imaging optical axis, and if a deviation included angle between a plane where the imaging lens clamping base bottom portion through hole 2661 is located and the target imaging optical axis is greater than a set target value, proceeding to Step B; Step B: selecting the limiting distance adjustment fastening member 272 in the limiting position adjustment hole 271 closest to an end portion of the objective lens 610, adjusting a downward passing depth of the limiting distance adjustment fastening member 272, and adjusting the force of the imaging lens clamping base bottom portion 261 pressing the corresponding first elastic supporting member 233 at the point; Step C: checking the deviation included angle between the plane where the imaging lens clamping base bottom portion through hole 2661 is located and the target imaging optical axis again, and if the deviation included angle is greater than the set target value, returning to Step B; and operating until the deviation included angle between the plane where the imaging lens clamping base bottom portion through hole 2661 is located and the target imaging optical axis is less than or equal to the set target value; and Step D: when the deviation included angle between the plane where the imaging lens clamping base lens through hole 266 is located and the target imaging optical axis is less than or equal to the set target value, fixedly connecting the imaging lens clamping base bottom portion 261 to the adjustment guide base 270.

Figure 19:
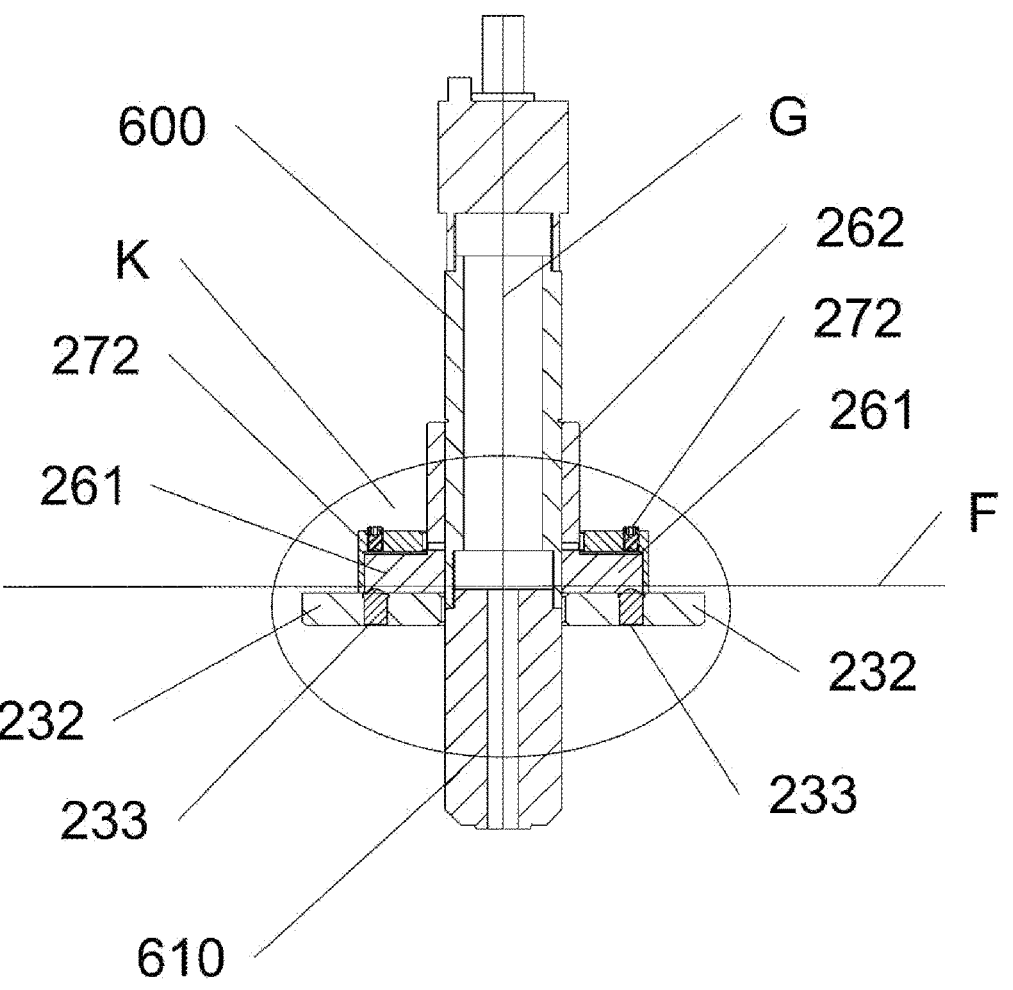
FIG. 19 is a BB sectional view of FIG. 18, where the mark F represents a contact surface F between a lower surface of an imaging lens clamping base bottom portion 261 and a first elastic supporting member 233; the mark G represents an imaging optical axis; and in an ideal state, the imaging optical axis G is perpendicular to the contact surface F, which means the imaging optical axis being orthogonal to an imaging target zone, and an image of a plane where the imaging target zone is located can be normally and microscopically magnified and is clear without double images.
Figure 20:
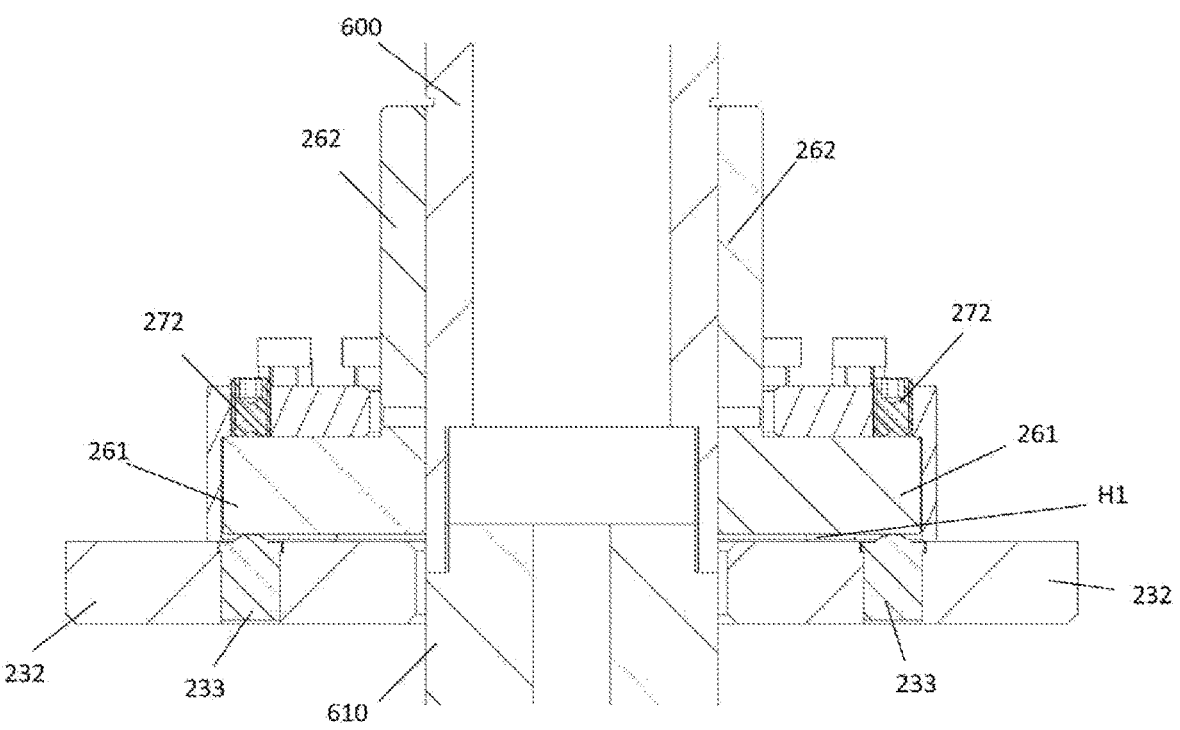
FIG. 20 is the first partial enlarged schematic diagram at part K in FIG. 19, where H1 represents a gap from the lower surface of the imaging lens clamping base bottom portion 261 and an upper surface of the imaging lens support bottom portion 232.
Figure 21:
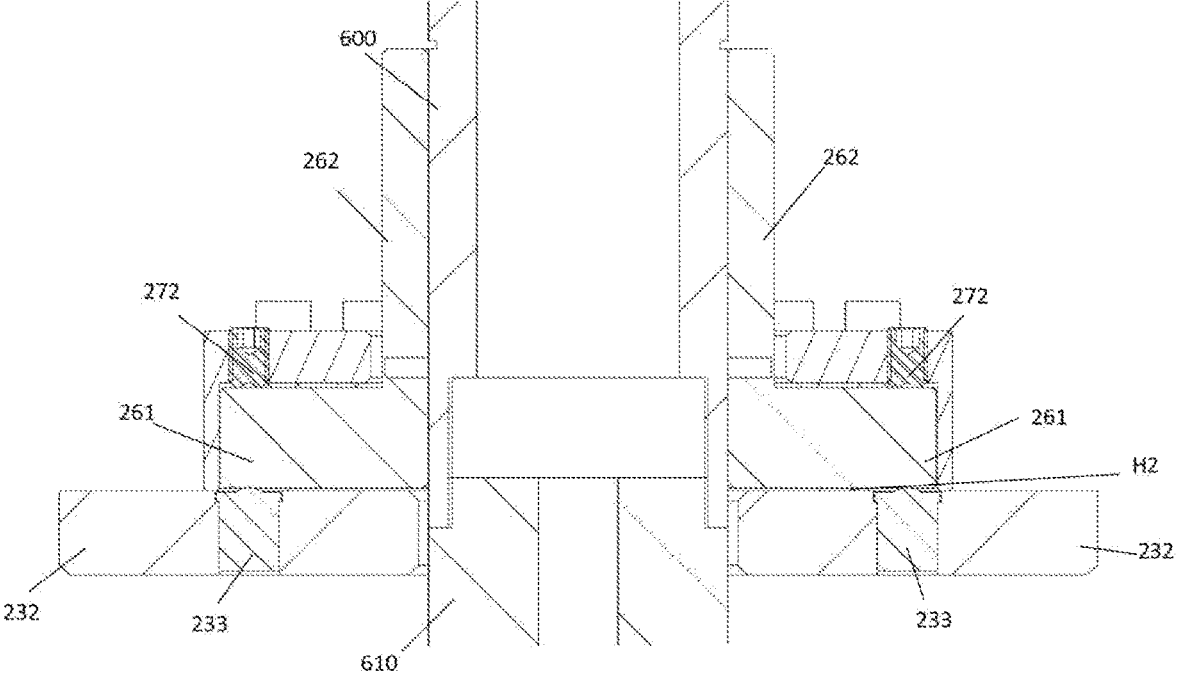
FIG. 21 is the second partial enlarged schematic diagram at part K in FIG. 20, where H2 represents the gap from the lower surface of the imaging lens clamping base bottom portion 261 and the upper surface of the imaging lens support bottom portion 232; and the gap H2 is smaller than the gap H1.

As shown in FIGS. 19-21, the imaging lens clamping base 260, the adjustment guide base 270 and the imaging lens support bottom portion 232 are assembled together; in the drawings, the mark F represents a contact surface F between a lower surface of the imaging lens clamping base bottom portion 261 and the first elastic supporting member 233; the mark G represents the imaging optical axis; and in an ideal state, the imaging optical axis G is perpendicular to the contact surface F, which means the imaging optical axis being orthogonal to an imaging target zone, and an image of a plane where the imaging target zone is located can be normally and microscopically magnified and is clear without double images. FIG. 20 shows a state, and FIG. 21 shows a state in which the first elastic supporting member 233 is pressed more severely. In FIG. 20, H1 represents a gap from the lower surface of the imaging lens clamping base bottom portion 261 and the upper surface of the imaging lens support bottom portion 232; in FIG. 21, H2 represents the gap from the lower surface of the imaging lens clamping base bottom portion 261 and the upper surface of the imaging lens support bottom portion 232; and the gap H2 is smaller than the gap H1.

Figure 22:
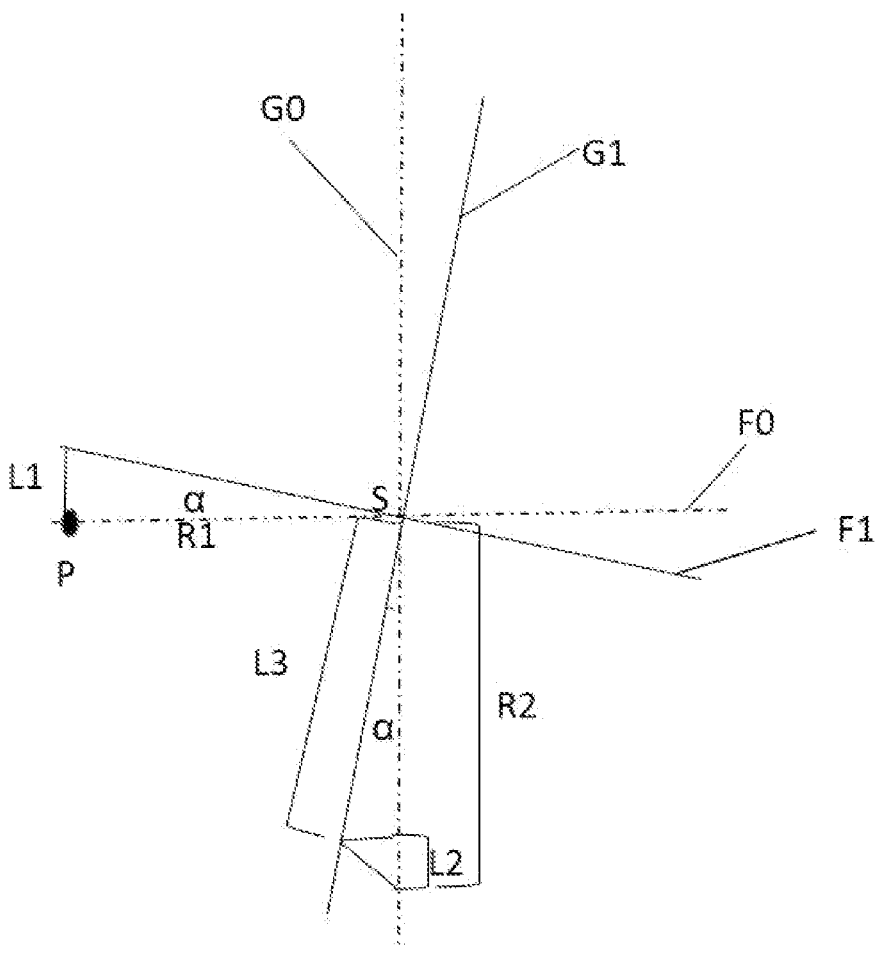
FIG. 22 is the first simplified schematic diagram of FIG. 19.
Figure 23:
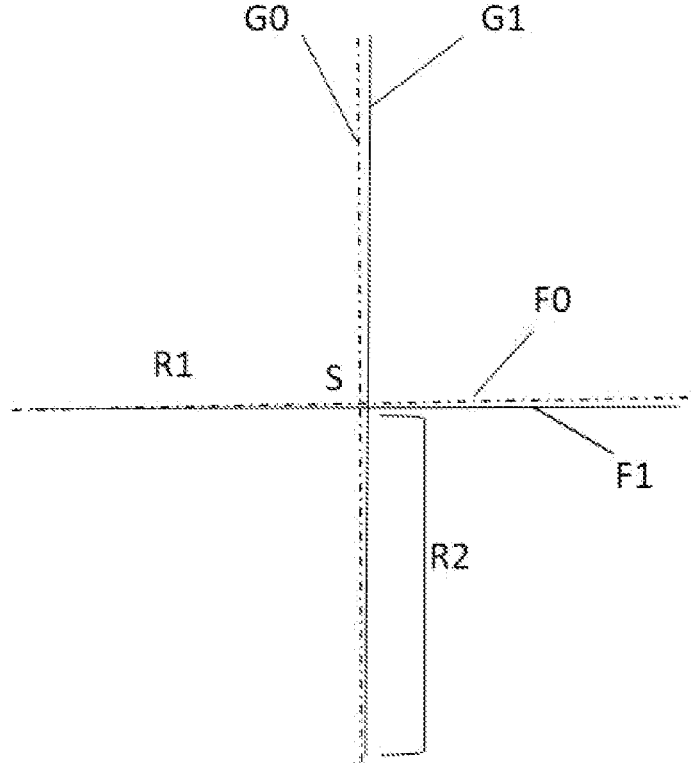
FIG. 23 is the second simplified schematic diagram of FIG. 19.

As shown in FIG. 22, an included angle $\alpha$ is formed between a main body G1 of the microscopic imaging module 600 and a target imaging optical axis G0, and then an included angle between the plane F1 where the imaging lens clamping base bottom portion 261 is located and the ideal contact surface F0 is also $\alpha$. When the included angle $\alpha$ is zero, as shown in FIG. 23, under the ideal conditions, the main body of the microscopic imaging module 600, namely, an actual optical axis G1, is overlapped with the target imaging optical axis G0, and then the plane F1 where the imaging lens clamping base bottom portion 261 is located is also overlapped with the position of the ideal contact surface F0. In FIG. 23, to show the difference, the actual optical axis G1 is not completely overlapped with the target imaging optical axis G0, and the plane F1 where the imaging lens clamping base bottom portion 261 is located is also not overlapped with the position of the ideal contact surface F0. However, the actual optical axis G1 is completely orthogonal to the plane F1 where the imaging lens clamping base bottom portion 261 is located. Of course, the target imaging optical axis G0 is also completely orthogonal to the ideal contact surface F0, and the point S is the intersection.

In FIGS. 22 and 23, R1 represents the distance from the first elastic supporting member 233 to the center of the imaging lens clamping base lens through hole 266, that is, the distance from the first elastic supporting member 233 to the central optical axis; R2 represents the distance from a front end portion of the objective lens 610 to the imaging lens clamping base bottom portion 261; L1 represents the distance by which the first elastic supporting member 233 is pressed downwards; and L2 represents the movement distance of the objective lens 610 on the target imaging optical axis G0 caused by adjustment of the distance L1. tan $\alpha$=L1/R1; therefore, the degrees of the angle $\alpha$ can be calculated, and $\alpha$=arctan(L1/R1); then it can be calculated as L2=R2−L3=R2−R2\*cos $\alpha$; and generally, the angle $\alpha$ is very small, cos $\alpha$ is very close to 1, and thus the actual size of L2 is usually very small. If the distance L2 is small enough, for example, L2 is less than or equal to the depth of field of an image, there is generally no substantial influence on the image quality of microscopic imaging. When the angle $\alpha$ is large and the distance L2 is greater than the depth of field of the image, there is substantial influence on the image quality of microscopic imaging, resulting in double images or inability to focus and image clearly.

Therefore, adjustment of the angle $\alpha$ is one of the key influence factors, and $\alpha$=arctan(L1/R1); and R1 is a fixed constant after the system structure is fixed, so that the adjustment precision of the angle $\alpha$ is determined by the adjustment precision of L1.

L1 can be adjusted by means of the downward movement distance of the fastening member. That is, the size of L1 can be controlled by means of the downward movement distance of the limiting distance adjustment fastening member 272. The higher the control precision of the downward movement distance of the limiting distance adjustment fastening member 272 is, the finer the adjustment of the angle $\alpha$ is.

During use of the present application, straight down type fastening members capable of directly controlling the downward movement distances of the fastening members can be used, and the downward movement distances of the fastening members can be adjusted and controlled by means of screw type fastening members, thereby improving the adjustment precision of the downward movement distances by one level.

In the present application, the limiting distance adjustment fastening members 272 are the screw type fastening members, including set screws. The downward movement distance of each screw type fastening member is controlled by means of a rotation angle; a helical pitch S is the downward movement distance of the screw type fastening member after one circle of rotation of a thread; therefore, L1=S/360. The range of the helical pitch S is 0.2 mm-1 mm; the fastening members may also be the limiting distance adjustment fastening members 272 with the helical pitches being 0.35 mm, 0.5 mm and 0.7 mm; and when L1 is greater than or equal to S, the fastening member can rotate by at least one circle, then L1=S\*n+S/360, and n is an integer number of rotation circles. The adjustment of the downward movement distance of the limiting distance adjustment fastening member 272 means that the micro adjustment of the downward movement distance is converted into the rotation angle and circle numbers of the limiting distance adjustment fastening member 272 by means of the helical pitch S, which is equivalent to converting the micro adjustment of the distance into the adjustment of the rotation angle, the means for adjusting the size precisely is enlarged, and micro adjustment can be performed on the rotation angle of the limiting distance adjustment fastening member 272 to achieve micro adjustment of the downward movement distance L1.

For example, when the helical pitch S of the limiting distance adjustment fastening member 272 is equal to 0.5 mm, L1=S/360=0.5 mm/360≈1.39 um, which means for each degree of rotation of the limiting distance adjustment fastening member 272, the downward movement distance is approximately 1.39 um, and the adjustment of the downward movement distance in um can be achieved. Even if the rotation angle is based on 30 degrees, the adjustment precision can still reach 30\*0.5 mm/360≈41.7 um, which is also more precise than the dimensions in mm.

In the present application, the screw type fastening members are used, thus the distance adjustment precision can be improved by the limiting distance adjustment fastening members 272, the adjustment of the distance L1 in $\alpha$=arctan (L1/R1) can be finer, the adjustment of the angle $\alpha$ can be finer, and the adjustment of the distance L2 in L2=R2−R2\*cos $\alpha$ can be finer. In the balance of the component machining precision and the cost, the high-precision size adjustment can be achieved by means of the relatively low machining precision, which is an efficient and low-cost solution, and the high-precision position adjustment can be achieved by means of the low-precision component machining sizes. That is, the distance adjustment in mm between the imaging lens clamping base bottom portion 261 and the adjustment guide base 270 can be converted into the distance adjustment in finer size of the objective lens 610 in the optical axis direction.

With regard to the imaging module bearing device and base, the microscopic image acquisition device and the adjusting method designed in the present application, the imaging module bearing device includes the imaging lens support, the imaging lens clamping base and the adjustment guide base; the imaging lens clamping base bottom portion is movably clamped between the imaging lens support and the adjustment guide base; and the levelness of the upper surface of the imaging lens clamping base bottom portion relative to the imaging lens support bottom portion can be adjusted until the microscopic imaging module fixed to the imaging lens clamping base is orthogonal to the upper surface of the imaging lens clamping base bottom portion, and the microscopic imaging module is fixed to the imaging lens clamping base. The distance adjustment in mm between the imaging lens clamping base bottom portion and the adjustment guide base is converted into the distance adjustment in finer size of the objective lens in the optical axis direction, thereby achieving the high-precision optical adjustment process.

The above embodiments as shown in FIGS. 1-23 are only the embodiments of the present application, and are not intended to limit the scope of the patent of the present application. Any equivalent structural transformation or equivalent flow transformation made by means of the contents of the description and the accompanying drawings of the present application, directly or indirectly applied in other relevant technical fields, falls within the scope of protection of the patent of the present application in the same way.

What is claimed is:

1. An imaging module bearing device, comprising:
an imaging lens support, an imaging lens clamping base and an adjustment guide base,
wherein the adjustment guide base is fixedly connected to the imaging lens support;
the imaging lens clamping base comprises an imaging lens clamping base bottom portion and a lens clamping portion; an imaging lens clamping base lens through hole passes through the imaging lens clamping base bottom portion and the lens clamping portion; the imaging lens support is provided with a support lens through hole;
the adjustment guide base is provided with a guide base through hole;
the lens clamping portion passes through the guide base through hole in the adjustment guide base such that the imaging lens clamping base bottom portion is movably clamped between the imaging lens support and the adjustment guide base; and
when the imaging lens clamping base bottom portion is clamped between the imaging lens support and the adjustment guide base, the position of the support lens through hole corresponds to the position of the imaging lens clamping base lens through hole;
wherein the imaging lens support comprises an imaging lens support bottom portion;
the support lens through hole is formed in the imaging lens support bottom portion;
the imaging lens support bottom portion is provided with at least three first elastic supporting members, and the plurality of first elastic supporting members are uniformly distributed with the support lens through hole serving as the center; and elastic supporting surfaces or elastic supporting points of the first elastic supporting members face upwards and are configured to support the imaging lens clamping base bottom portion.

2. The imaging module bearing device according to claim 1,
wherein the adjustment guide base is provided with at least three limiting position adjustment holes, and the at least three limiting position adjustment holes are internally provided with limiting distance adjustment fastening members; and
the position of each of the at least three limiting position adjustment holes corresponds to the position of the respective first elastic supporting member.

3. The imaging module bearing device according to claim 2,
wherein each of the at least three limiting position adjustment holes is a limiting position adjustment through hole; and each of the limiting distance adjustment fastening members passes through the respective limiting position adjustment through hole to be in contact with the imaging lens clamping base bottom portion.

4. An adjusting method for a microscopic image acquisition device,
which is based on the imaging module bearing device according to claim 1 and
a microscopic imaging module fixed to an imaging lens clamping base,
wherein the microscopic imaging module comprises an objective lens;
the objective lens passes through the imaging lens clamping base, the objective lens is clamped and fixed by the imaging lens clamping base, and one end of the objective lens is located below a plane where an imaging lens clamping base bottom portion is located; a target imaging optical axis passes through the objective lens; and
the adjusting method comprises the following steps:
Step A: acquiring a deviation direction of an imaging lens clamping base lens through hole from the target imaging optical axis, and if a deviation included angle between a plane where the imaging lens clamping base lens through hole is located and the target imaging optical axis is greater than a set target value, proceeding to Step B;
Step B: selecting a limiting distance adjustment fastening member in a limiting position adjustment hole closest to an end portion of the objective lens, adjusting a downward passing depth of the limiting distance adjustment fastening member, and adjusting the force of the imaging lens clamping base bottom portion pressing a corresponding first elastic supporting member at the point; and
Step C: checking the deviation included angle between the plane where the imaging lens clamping base lens through hole is located and the target imaging optical axis again, and if the deviation included angle is greater than the set target value, returning to Step B; and operating until the deviation included angle between the plane where the imaging lens clamping base lens through hole is located and the target imaging optical axis is less than or equal to the set target value.

5. The adjusting method according to claim 4,
further comprising Step D: when the deviation included angle between the plane where the imaging lens clamping base lens through hole is located and the target imaging optical axis is less than or equal to the set target value, fixedly connecting the imaging lens clamping base bottom portion to an adjustment guide base.

6. The imaging module bearing device according to claim 2,
wherein each of the limiting distance adjustment fastening members is a screw type fastening member, and a downward movement distance of the screw type fastening member is controlled by means of a rotation angle; a helical pitch S is the downward movement distance of the screw type fastening member after one circle of rotation of a thread; and the range of the helical pitch S of the screw type fastening member is 0.2 mm-1 mm.

7. The imaging module bearing device according to claim 2, wherein two position fixing through holes A1 are symmetrically formed on two sides of each of the at least three limiting position adjustment holes in the adjustment guide base;

correspondingly, two position fixing through holes B1 are also formed in the imaging lens clamping base bottom portion; and position fixing fastening members sequentially pass through the corresponding fixing through holes A1 and the corresponding fixing through holes B1, so as to fix the relative positions of the adjustment guide base and the imaging lens clamping base bottom portion.

8. An imaging module bearing device, comprising:

an imaging lens support, an imaging lens clamping base and an adjustment guide base, wherein the adjustment guide base is fixedly connected to the imaging lens support;

the imaging lens clamping base comprises an imaging lens clamping base bottom portion and a lens clamping portion; an imaging lens clamping base lens through hole passes through the imaging lens clamping base bottom portion and the lens clamping portion; the imaging lens support is provided with a support lens through hole;

the adjustment guide base is provided with a guide base through hole;

the lens clamping portion passes through the guide base through hole in the adjustment guide base such that the imaging lens clamping base bottom portion is movably clamped between the imaging lens support and the adjustment guide base; and when the imaging lens clamping base bottom portion is clamped between the imaging lens support and the adjustment guide base, the position of the support lens through hole corresponds to the position of the imaging lens clamping base lens through hole;

imaging module bearing device further comprises an electric motor support and a movable plate, wherein the electric motor support is configured to fix an electric motor for driving the imaging module to move;

the movable plate is configured to be connected to a driving force output device of the electric motor; and the imaging lens support is fixedly connected to the movable plate, and the imaging lens support acquires movement power by means of the movable plate.

9. The imaging module bearing device according to claim 8, further comprising an electric motor main body and the driving force output device, wherein the electric motor main body is fixed to the electric motor support; a rotating shaft of the electric motor main body is connected to the driving force output device; and the driving force output device is connected to the movable plate to drive the movable plate to move.

10. The imaging module bearing device according to claim 1, wherein when the imaging lens clamping base bottom portion is pressed on the first elastic supporting members, the range of downward movement distances of the first elastic supporting members is 0.3 mm-2 mm.

11. The imaging module bearing device according to claim 1, wherein the adjustment guide base is provided with at least three second elastic supporting members which are configured to radially support the imaging lens clamping base bottom portion; the at least three second elastic supporting members are uniformly distributed with the geometric center of the adjustment guide base serving as the center, and the at least three second elastic supporting members are radially arranged with the imaging lens clamping base lens through hole serving as the center; and elastic supporting surfaces or elastic supporting points of the at least three second elastic supporting members face the radial center of the imaging lens clamping base lens through hole and are configured to be in contact with a side wall of the imaging lens clamping base bottom portion.

12. The imaging module bearing device according to claim 1, wherein the imaging lens support further comprises an imaging lens support vertical surface and two imaging lens support supporting half side vertical surfaces; the imaging lens support is fixedly connected to the movable plate by means of the imaging lens support vertical surface such that the imaging lens support can move along with the movable plate; and the imaging lens support bottom portion is fixedly connected to the imaging lens support vertical surface by means of the two imaging lens support supporting half side vertical surfaces.

13. An imaging module bearing base which is configured to bear a microscopic image acquisition device, comprising:

an imaging module bearing device, the imaging module bearing device comprising:

an imaging lens support, an imaging lens clamping base and an adjustment guide base, wherein the adjustment guide base is fixedly connected to the imaging lens support;

the imaging lens clamping base comprises an imaging lens clamping base bottom portion and a lens clamping portion; an imaging lens clamping base lens through hole passes through the imaging lens clamping base bottom portion and the lens clamping portion; the imaging lens support is provided with a support lens through hole;

the adjustment guide base is provided with a guide base through hole;

the lens clamping portion passes through the guide base through hole in the adjustment guide base such that the imaging lens clamping base bottom portion is movably clamped between the imaging lens support and the adjustment guide base; and when the imaging lens clamping base bottom portion is clamped between the imaging lens support and the adjustment guide base, the position of the support lens through hole corresponds to the position of the imaging lens clamping base lens through hole;

wherein the imaging module bearing base further comprises a bearing base plate, a first bearing support, a second bearing support and an imaging target clamping module, wherein the first bearing support and the second bearing support are arranged on the bearing base plate respectively;

the first bearing support is configured to bear the imaging module bearing device;

the second bearing support is configured to bear the imaging target clamping module such that the imaging target clamping module is arranged below the imaging module bearing device;

the first bearing support comprises a longitudinal supporting column and a transverse supporting arm, and the longitudinal supporting column is fixedly connected to one end of the transverse supporting arm;

a transverse supporting arm outward extension portion is provided with a transverse supporting arm fixing through hole, and the imaging module bearing device is fixed to the transverse supporting arm by means of the transverse supporting arm fixing through hole; and the second bearing support is provided with a second supporting through hole, and the center of the transverse supporting arm fixing through hole is fixed relative to the center of the second supporting through hole.

14. The imaging module bearing base according to claim 13, wherein the connection of the transverse supporting arm outward extension portion with the longitudinal supporting column is enhanced by means of a reinforcing corner brace; and the bottom of the bearing base plate is provided with a plurality of shock-proof damping support feet.

15. The imaging module bearing base according to claim 13, wherein the imaging target clamping module comprises an XY-axis movement platform module and a reagent card clamping base module;

the reagent card clamping base module is fixed at the top of the XY-axis movement platform module; and the XY-axis movement platform module is fixed to the top of the second bearing support.

16. The imaging module bearing base according to claim 15, wherein the reagent card clamping base module comprises a reagent card clamping base main body and a reagent card clamping portion;

the reagent card clamping portion is configured to clamp an externally inserted reagent card; and a bottom surface of the reagent card clamping base main body is parallel with a bottom surface of the reagent card clamping portion.

17. The imaging module bearing base according to claim 15, wherein the second bearing support is provided with a plurality of third elastic supporting members which are configured to adjust the levelness of a bottom surface of the XY-axis movement platform module; and a top surface of the XY-axis movement platform module is provided with a plurality of fourth elastic supporting members which are configured to adjust the levelness of a bottom surface of the reagent card clamping base module.

18. The imaging module bearing base according to claim 13, further comprising a light source module, wherein a light source fixing circular truncated cone is arranged on the second bearing support and takes the second supporting through hole as the center; the light source module is fixed to the light source fixing circular truncated cone; and a light source emitted light ray in the light source module and an imaging lens in the imaging module bearing device are located on the same imaging optical axis.

\* \* \* \* \*